(12) United States Patent
Rosen et al.

(10) Patent No.: US 11,379,492 B2
(45) Date of Patent: Jul. 5, 2022

(54) INTERNAL RESOURCE PROVISIONING IN DATABASE SYSTEMS

(71) Applicant: Snowflake Inc., Bozeman, MT (US)

(72) Inventors: Jeffrey Rosen, San Mateo, CA (US); Abdul Munir, San Mateo, CA (US); Jiaqi Yan, San Mateo, CA (US); William Waddington, Truckee, CA (US); Prasanna Rajaperumal, San Mateo, CA (US); Thierry Cruanes, San Mateo, CA (US)

(73) Assignee: Snowflake Inc., Bozeman, MT (US)

( * ) Notice: Subject to any disclaimer, the term of this patent is extended or adjusted under 35 U.S.C. 154(b) by 0 days.

(21) Appl. No.: 17/477,663

(22) Filed: Sep. 17, 2021

(65) Prior Publication Data

US 2022/0004552 A1 Jan. 6, 2022

Related U.S. Application Data

(63) Continuation of application No. 16/778,954, filed on Jan. 31, 2020, now Pat. No. 11,138,214, which is a
(Continued)

(51) Int. Cl.
*G06F 16/2458* (2019.01)
*G06F 16/2453* (2019.01)
(Continued)

(52) U.S. Cl.
CPC ......... *G06F 16/2465* (2019.01); *G06F 9/505* (2013.01); *G06F 9/5077* (2013.01);
(Continued)

(58) Field of Classification Search
CPC ........... G06F 16/2465; G06F 16/24535; G06F 16/24542; G06F 16/24565; G06F 9/5077; G06F 9/505
See application file for complete search history.

(56) References Cited

U.S. PATENT DOCUMENTS 5,546,576 A 8/1996 Cochrane et al.
6,092,062 A 7/2000 Lohman et al.
(Continued)

OTHER PUBLICATIONS

"U.S. Appl. No. 16/380,848, Examiner Interview Summary dated Apr. 19, 2021", 2 pgs.
(Continued)

*Primary Examiner* — Robert W Beausoliel, Jr.
*Assistant Examiner* — Susan F Rayyan
(74) *Attorney, Agent, or Firm* — Schwegman Lundberg & Woessner, P.A.

(57) ABSTRACT

Resource provisioning systems and methods are described. In an embodiment, a system includes a plurality of shared storage devices collectively storing database data, an execution platform, and a compute service manager. The compute service manager is configured to determine a task to be executed in response to a trigger event and determine a query plan for executing the task, wherein the query plan comprises a plurality of discrete subtasks. The compute service manager is further configured to assign the plurality of discrete subtasks to one or more nodes of a plurality of nodes of the execution platform, determine whether execution of the task is complete, and in response to determining the execution of the task is complete, store a record in the plurality of shared storage devices indicating the task was completed.

20 Claims, 10 Drawing Sheets

Related U.S. Application Data continuation of application No. 16/380,848, filed on Apr. 10, 2019, now Pat. No. 11,138,213.

(51) Int. Cl.
  *G06F 9/50* (2006.01)
  *G06F 16/2455* (2019.01)
(52) U.S. Cl.
  CPC .. *G06F 16/24535* (2019.01); *G06F 16/24542* (2019.01); *G06F 16/24565* (2019.01)

(56) References Cited

U.S. PATENT DOCUMENTS

| | | | |
|---|---|---|---|
| 6,266,669 | B1 | 7/2001 | Brodersen |
| 6,763,352 | B2 | 7/2004 | Cochrane et al. |
| 6,882,993 | B1* | 4/2005 | Lawande ............ G06F 16/2393 707/714 |
| 7,092,931 | B1 | 8/2006 | Kaluskar et al. |
| 7,152,026 | B1* | 12/2006 | Merritt ................ G06F 11/2028 703/21 |
| 7,818,297 | B2 | 10/2010 | Peleg et al. |
| 9,672,122 | B1 | 6/2017 | Gandhi et al. |
| 10,761,813 | B1 | 9/2020 | Echeverria et al. |
| 10,776,441 | B1 | 9/2020 | Echeverria et al. |
| 11,086,894 | B1 | 8/2021 | Srivastava et al. |
| 11,138,213 | B2 | 10/2021 | Rosen et al. |
| 11,138,214 | B2 | 10/2021 | Rosen et al. |
| 2003/0195898 | A1 | 10/2003 | Agarwal et al. |
| 2004/0030677 | A1 | 2/2004 | Young-lai |
| 2004/0034643 | A1 | 2/2004 | Bonner et al. |
| 2006/0080285 | A1 | 4/2006 | Chowdhuri |
| 2006/0224563 | A1 | 10/2006 | Hanson et al. |
| 2007/0022100 | A1 | 1/2007 | Kitsuregawa et al. |
| 2008/0120129 | A1 | 5/2008 | Seubert et al. |
| 2008/0301135 | A1 | 12/2008 | Alves et al. |
| 2009/0276394 | A1 | 11/2009 | Bestgen et al. |
| 2009/0300637 | A1* | 12/2009 | Ringseth ............... G06F 9/4881 718/104 |
| 2010/0005077 | A1 | 1/2010 | Krishnamurthy et al. |
| 2011/0047554 | A1 | 2/2011 | Lakshmanan et al. |
| 2011/0265088 | A1 | 10/2011 | Devadhar et al. |
| 2011/0302151 | A1* | 12/2011 | Abadi ................. G06F 16/2456 707/714 |
| 2011/0321051 | A1 | 12/2011 | Rastogi |
| 2012/0310916 | A1* | 12/2012 | Abadi ................. G06F 16/24542 707/713 |
| 2012/0330924 | A1 | 12/2012 | Rajan et al. |
| 2013/0086589 | A1 | 4/2013 | Levien et al. |
| 2013/0290973 | A1 | 10/2013 | Waas et al. |
| 2014/0108861 | A1* | 4/2014 | Abadi ................. G06F 16/24542 714/11 |
| 2014/0280029 | A1* | 9/2014 | Ding ................. G06F 16/24539 707/717 |
| 2015/0007183 | A1 | 1/2015 | Luo |
| 2015/0026260 | A1 | 1/2015 | Worthley |
| 2015/0261573 | A1 | 9/2015 | Rausch et al. |
| 2016/0055225 | A1 | 2/2016 | Xu et al. |
| 2016/0299799 | A1 | 10/2016 | De Smet |
| 2016/0342654 | A1* | 11/2016 | Bendel ............... G06F 16/24542 |
| 2017/0061364 | A1* | 3/2017 | Waltz .................. G06F 16/2453 |
| 2017/0279901 | A1 | 9/2017 | Carricarte et al. |
| 2018/0068008 | A1* | 3/2018 | Cruanes ................ G06F 16/211 |
| 2018/0089259 | A1 | 3/2018 | James et al. |
| 2018/0225331 | A1* | 8/2018 | Agrawal ........... G06F 16/24549 |
| 2018/0239636 | A1 | 8/2018 | Arora |
| 2018/0293098 | A1* | 10/2018 | LaRock ................ G06F 9/5066 |
| 2019/0095491 | A1 | 3/2019 | Bhattacharjee et al. |
| 2019/0095493 | A1 | 3/2019 | Bhattacharjee et al. |
| 2019/0138638 | A1* | 5/2019 | Pal ........................ G06F 9/4881 |
| 2019/0138642 | A1 | 5/2019 | Pal et al. |
| 2019/0147084 | A1 | 5/2019 | Pal et al. |
| 2019/0147086 | A1* | 5/2019 | Pal ..................... G06F 16/2425 707/718 |
| 2019/0332698 | A1* | 10/2019 | Cho .................... G06F 16/2393 |
| 2020/0065736 | A1 | 2/2020 | Relangi |
| 2020/0133937 | A1* | 4/2020 | Cruanes ................. G06F 16/24 |
| 2020/0327123 | A1 | 10/2020 | Rosen et al. |
| 2020/0327124 | A1 | 10/2020 | Rosen et al. |
| 2020/0334239 | A1* | 10/2020 | Muralidhar ......... G06F 16/2393 |
| 2021/0397615 | A1 | 12/2021 | Rosen et al. |

OTHER PUBLICATIONS

"U.S. Appl. No. 16/380,848, Non-Final Office Action dated Jan. 15, 2021", 11 pgs.
"U.S. Appl. No. 16/380,848, Notice of Allowance dated May 6, 2021", 9 pgs.
"U.S. Appl. No. 16/380,848, Notice of Allowance dated Jul. 22, 2021", 10 pgs.
"U.S. Appl. No. 16/380,848, Response filed Apr. 15, 2021 to Non Final Office Action dated Jan. 15, 2021", 13 pgs.
"U.S. Appl. No. 16/778,954, Examiner Interview Summary dated Mar. 30, 2021", 2 pgs.
"U.S. Appl. No. 16/778,954, Examiner Interview Summary dated Jun. 30, 2020", 3 pgs.
"U.S. Appl. No. 16/778,954, Examiner Interview Summary dated Nov. 4, 2020", 2 pgs.
"U.S. Appl. No. 16/778,954, Final Office Action dated Apr. 21, 2021", 14 pgs.
"U.S. Appl. No. 16/778,954, Final Office Action dated Sep. 1, 2020", 30 pgs.
"U.S. Appl. No. 16/778,954, Non-Final Office Action dated Apr. 3, 2020", 29 pgs.
"U.S. Appl. No. 16/778,954, Non-Final Office Action dated Dec. 28, 2020", 32 pgs.
"U.S. Appl. No. 16/778,954, Notice of Allowance dated Jul. 12, 2021", 9 pgs.
"U.S. Appl. No. 16/778,954, Response filed Mar. 29, 2021 to Non-Final Office Action dated Dec. 28, 2020", 14 pgs.
"U.S. Appl. No. 16/778,954, Response filed Jun. 21, 2021 to Final Office Action dated Apr. 21, 2021", 10 pgs.
"U.S. Appl. No. 16/778,954, Response filed Jul. 1, 2020 to Non-Final Office Action dated Apr. 3, 2020", 13 pgs.
"U.S. Appl. No. 16/778,954, Response filed Oct. 30, 2020 to Final Office Action dated Sep. 1, 2020", 13 pgs.
"U.S. Appl. No. 17/462,699, Non Final Office Action dated Nov. 18, 2021", 12 pgs.
"U.S. Appl. No. 17/462,699, Response filed Feb. 1, 2022 to Non Final Office Action dated Nov. 18, 2021", 11 pgs.
"U.S. Appl. No. 17/462,699, Notice of Allowance dated Mar. 1, 2022", 10 pgs.

* cited by examiner

INTERNAL RESOURCE PROVISIONING IN DATABASE SYSTEMS

CROSS-REFERENCE TO RELATED APPLICATIONS

The present application is a continuation of U.S. patent application Ser. No. 16/778,954 filed Jan. 31, 2020, which is a continuation of U.S. patent application Ser. No. 16/380,848, filed on Apr. 10, 2019, the contents of which are incorporated herein by reference in their entireties.

TECHNICAL FIELD

The present disclosure relates to systems, methods, and devices for databases and more particularly relates to resource management related to data processing and data storage.

BACKGROUND

Databases are an organized collection of data that enable data to be easily accessed, manipulated, and updated. Databases serve as a method of storing, managing, and retrieving information in an efficient manner. Traditional database management requires companies to provision infrastructure and resources to manage the database in a data center. Management of a traditional database can be very costly and requires oversight by multiple persons having a wide range of technical skill sets.

Traditional relational database management systems (RDMS) require extensive computing and storage resources and have limited scalability. Large sums of data may be stored across multiple computing devices. A server may manage the data such that it is accessible to customers with on-premises operations. For an entity that wishes to have an in-house database server, the entity must expend significant resources on a capital investment in hardware and infrastructure for the database, along with significant physical space for storing the database infrastructure. Further, the database may be highly susceptible to data loss during a power outage or other disaster situations. Such traditional database systems have significant drawbacks that may be alleviated by a cloud-based database system.

A cloud database system may be deployed and delivered through a cloud platform that allows organizations and end users to store, manage, and retrieve data from the cloud. Some cloud database systems include a traditional database architecture that is implemented through the installation of database software on top of a computing cloud. The database may be accessed through a Web browser or an application programming interface (API) for application and service integration. Some cloud database systems are operated by a vendor that directly manages backend processes of database installation, deployment, and resource assignment tasks on behalf of a client. The client may have multiple end users that access the database by way of a Web browser and/or API. Cloud databases may provide significant benefits to some clients by mitigating the risk of losing database data and allowing the data to be accessed by multiple users across multiple geographic regions.

Databases are widely used for data storage and access in computing applications. A goal of database storage is to provide enormous sums of information in an organized manner so that it can be accessed, managed, and updated. In a database, data may be organized into rows, columns, and tables. Different database storage systems may be used for storing different types of content, such as bibliographic, full text, numeric, and/or image content. Further, in computing, different database systems may be classified according to the organization approach of the database. There are many different types of databases, including relational databases, distributed databases, cloud databases, object-oriented and others.

Queries can be executed against database data to find certain data within the database and respond to a question about the database data. A database query extracts data from the database and formats it into a readable form. For example, when a user wants data from a database, the user may write a query in the language required by the database. The query may request specific information from the database. For example, if the database includes information about sales transactions made by a retail store, a query may request all transactions for a certain product during a certain time frame. The query may request any pertinent information that is stored within the database. If the appropriate data can be found to respond to the query, the database has the potential to reveal complex trends and activities. This power can only be harnessed through the use of a successfully executed query.

Many existing data storage and retrieval systems are available today. For example, in a shared-disk system, all data is stored on a shared storage device that is accessible from all of the processing nodes in a data cluster. In this type of system, all data changes are written to the shared storage device to ensure that all processing nodes in the data cluster access a consistent version of the data. As the number of processing nodes increases in a shared-disk system, the shared storage device (and the communication links between the processing nodes and the shared storage device) becomes a bottleneck that slows data read and data write operations. This bottleneck is further aggravated with the addition of more processing nodes. Thus, existing shared-disk systems have limited scalability due to this bottleneck problem.

Another existing data storage and retrieval system is referred to as a "shared-nothing architecture." In this architecture, data is distributed across multiple processing nodes such that each node stores a subset of the data in the entire database. When a new processing node is added or removed, the shared-nothing architecture must rearrange data across the multiple processing nodes. This rearrangement of data can be time-consuming and disruptive to data read and write operations executed during the data rearrangement. And, the affinity of data to a particular node can create "hot spots" on the data cluster for popular data. Further, since each processing node performs also the storage function, this architecture requires at least one processing node to store data. Thus, the shared-nothing architecture fails to store data if all processing nodes are removed. Additionally, management of data in a shared-nothing architecture is complex due to the distribution of data across many different processing nodes.

The systems and methods described herein provide an improved approach to data storage and data retrieval that alleviates the above-identified limitations of existing systems.

BRIEF DESCRIPTION OF THE DRAWINGS

Non-limiting and non-exhaustive embodiments of the present disclosure are described with reference to the following figures, wherein like reference numerals refer to like parts throughout the various figures unless otherwise specified.

DETAILED DESCRIPTION

Figure 1:
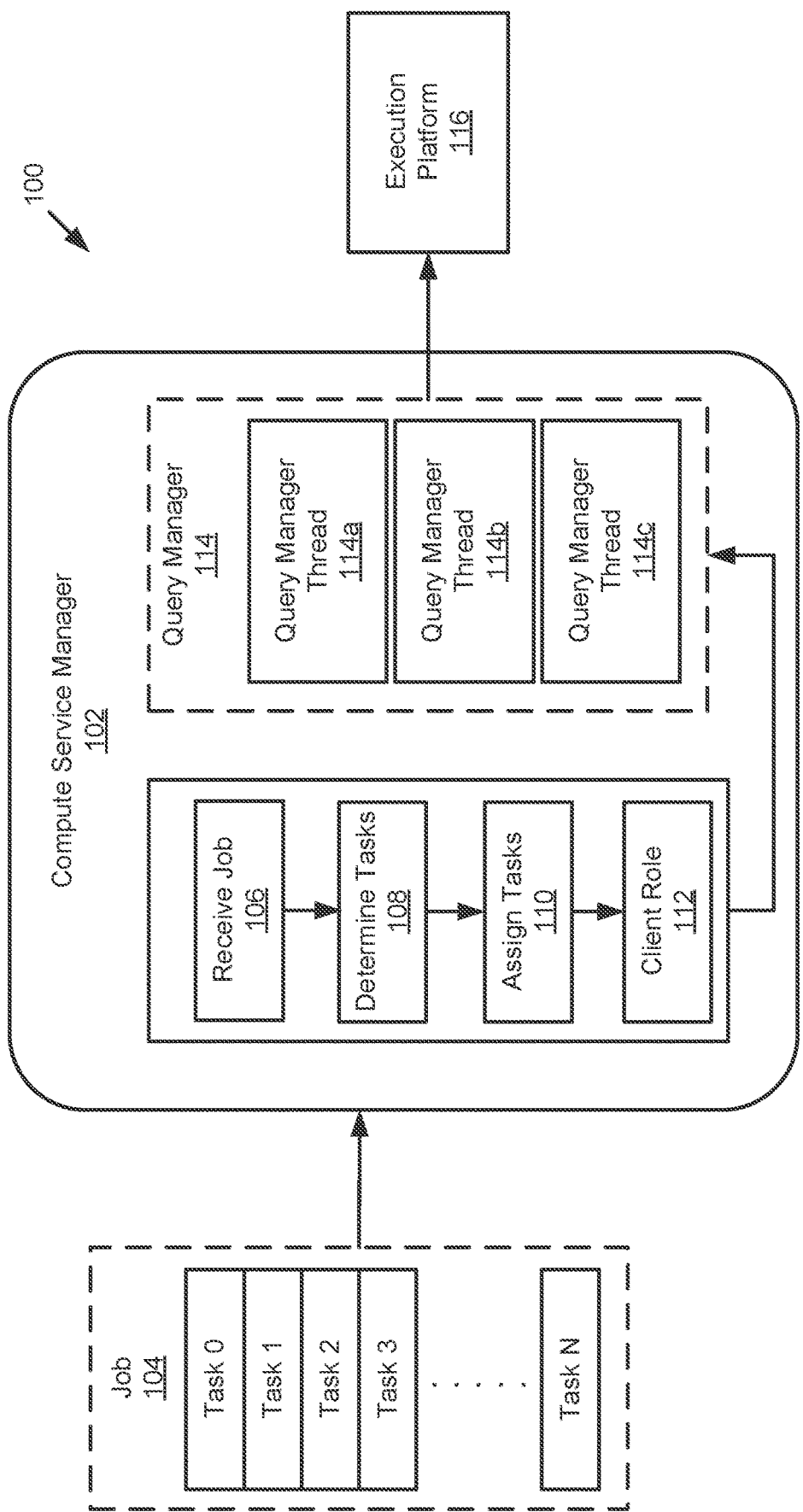
FIG. 1 is a block diagram illustrating an example process flow for scheduling tasks on a database, according to one embodiment of the disclosure.

The systems, methods, and devices described herein provide a new means for scheduling and executing tasks on shared storage and execution platforms. The systems, methods, and devices described herein may be implemented on multiple tenant cloud-based database platforms. In some instances, it may be desirable to execute "internal" tasks on the database to improve database operations or optimize database storage. Such internal tasks may be triggered by a time schedule and/or some programmatic logic that is triggered by an update or other change to the database. Such internal tasks may not be received directly from a client but may instead be configured to providing behind-the-scenes optimizations to the database. Such optimizations may include, for example, reclustering a table, refreshing a materialized view, propagating an update to one or more replications of data, updating a change tracking summary, and so forth. Such internal tasks may be generated and executed in a platform that is effectively infinitely scalable to ensure acceptable task latency and task throughput.

Such systems, methods, and devices provide a low effort and low overhead means to build new services in a database system. Such services may include, for example, an automated data clustering service, an automated materialized view refresh service, a file compaction service, a storage procedure service, a file upgrade service, and so forth. Further, the disclosures herein provide means to execute internal jobs that improve query performance of the database and/or improve data organization in the database. Further, the disclosures herein provide means to run queries on behalf of a client account and to view, manage, and audit one or more discrete tasks associated with a job. Additionally, the disclosures herein provide for built-in automatic scaling of processing resources for asynchronously executing one or more discrete tasks.

In an embodiment, a compute service manager schedules and manages the execution of a job by separating the job into one or more discrete tasks. The compute service manager may convert scheduled work (i.e. a "job") into a plurality of discrete tasks and manage the asynchronous execution of those discrete tasks by an execution platform. The compute service manager may schedule and manage the execution of tasks for a variety of implementations and may be particularly suited for scheduling the execution of tasks for a clustering service, a materialized view refresh service, a file compaction service, a storage procedure execution service, and a file upgrade service. The compute service manager may be particularly implemented for scheduling and managing the execution of internal "behind the scenes" jobs that are not directly received from a client account. Such internal jobs may improve the functionality or organization of database systems by, for example, reclustering data, incrementally refreshing a materialized view based on a source table, and so forth.

It should be appreciated that the compute service manager may manage the execution of any number of jobs or type of jobs. In an embodiment, the compute service manager is particularly suited to managing the execution of internal "behind the scenes" jobs that are not visible to a client account. Such internal jobs include, for example, table reclustering and the automated refresh of a materialized view.

The compute service manager may manage and schedule jobs within various user-specified restraints. For example, a client account may specify retry constraints that indicate a number of times a job may be re-executed and when the job should be re-executed. A client account may uniquely tag a job and indicate that certain jobs should be executed on certain database tables. In an embodiment, the compute service manager permits a client account to search scheduled work by any suitable parameter, including for example, account identification, individual work item identification name, timestamp, or type of work. A client account may indicate that a single work item should be converted into one or more jobs and/or that a single job should be converted into one or more discrete tasks.

In an embodiment, the compute service manager programmatically spawns jobs to execute arbitrary structured query language (SQL) commands. In such an embodiment, the compute service manager may look at a set of parameters to determine if an "internal" job or a "customer-facing" job needs to be performed.

The systems and methods described herein provide a new platform for storing and retrieving data without the problems faced by existing systems. For example, this new platform supports the addition of new nodes without the need for rearranging data files as required by the shared-nothing architecture. Additionally, nodes can be added to the platform without creating bottlenecks that are common in the shared-disk system. This new platform is always available for data read and data write operations, even when some of the nodes are offline for maintenance or have suffered a failure. The described platform separates the data storage resources from the computing resources so that data can be stored without requiring the use of dedicated computing resources. This is an improvement over the shared-nothing architecture, which fails to store data if all computing resources are removed. Therefore, the new platform continues to store data even though the computing resources are no longer available or are performing other tasks.

In the following description, reference is made to the accompanying drawings that form a part thereof, and in which is shown by way of illustration specific exemplary embodiments in which the disclosure may be practiced. These embodiments are described in sufficient detail to enable those skilled in the art to practice the concepts disclosed herein, and it is to be understood that modifications to the various disclosed embodiments may be made, and other embodiments may be utilized, without departing from the scope of the present disclosure. The following detailed description is, therefore, not to be taken in a limiting sense.

Reference throughout this specification to "one embodiment," "an embodiment," "one example" or "an example" means that a particular feature, structure or characteristic described in connection with the embodiment or example is included in at least one embodiment of the present disclosure. Thus, appearances of the phrases "in one embodiment," "in an embodiment," "one example" or "an example" in various places throughout this specification are not necessarily all referring to the same embodiment or example. In addition, it should be appreciated that the figures provided herewith are for explanation purposes to persons ordinarily skilled in the art and that the drawings are not necessarily drawn to scale.

Embodiments in accordance with the present disclosure may be embodied as an apparatus, method or computer program product. Accordingly, the present disclosure may take the form of an entirely hardware-comprised embodiment, an entirely software-comprised embodiment (including firmware, resident software, micro-code, etc.) or an embodiment combining software and hardware aspects that may all generally be referred to herein as a "circuit," "module" or "system." Furthermore, embodiments of the present disclosure may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random-access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present disclosure may be written in any combination of one or more programming languages. Such code may be compiled from source code to computer-readable assembly language or machine code suitable for the device or computer on which the code will be executed.

Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction and then scaled accordingly. A cloud model can be composed of various characteristics (e.g., on-demand self-service, broad network access, resource pooling, rapid elasticity, and measured service), service models (e.g., Software as a Service ("SaaS"), Platform as a Service ("PaaS"), and Infrastructure as a Service ("IaaS")), and deployment models (e.g., private cloud, community cloud, public cloud, and hybrid cloud).

The flow diagrams and block diagrams in the attached figures illustrate the architecture, functionality, and operation of possible implementations of systems, methods, and computer program products according to various embodiments of the present disclosure. In this regard, each block in the flow diagrams or block diagrams may represent a module, segment, or portion of code, which comprises one or more executable instructions for implementing the specified logical function(s). It will also be noted that each block of the block diagrams and/or flow diagrams, and combinations of blocks in the block diagrams and/or flow diagrams, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flow diagram and/or block diagram block or blocks.

The systems and methods described herein provide a flexible and scalable data warehouse using a new data processing platform. In some embodiments, the described systems and methods leverage a cloud infrastructure that supports cloud-based storage resources, computing resources, and the like. Example cloud-based storage resources offer significant storage capacity available on-demand at a low cost. Further, these cloud-based storage resources may be fault-tolerant and highly scalable, which can be costly to achieve in private data storage systems. Example cloud-based computing resources are available on-demand and may be priced based on actual usage levels of the resources. Typically, the cloud infrastructure is dynamically deployed, reconfigured, and decommissioned in a rapid manner.

In the described systems and methods, a data storage system may utilize an SQL (Structured Query Language)-based relational database. However, these systems and methods are applicable to any type of database, and any type of data storage and retrieval platform, using any data storage architecture and using any language to store and retrieve data within the data storage and retrieval platform. The systems and methods described herein further provide a multi-tenant system that supports isolation of computing resources and data between different customers/clients and between different users within the same customer/client.

Turning to the figures, FIG. 1 is a block diagram of an example embodiment of a process flow 100 for managing and executing jobs on a database system. In an embodiment, the process flow 100 is carried out by a compute service manager 102 that is configured to manage and execute jobs on a new data processing platform (see, e.g. FIGS. 2-5). The compute service manager 102 receives a job 104 that may be divided into one or more discrete tasks, e.g. task 0, task 1, task 2, task 3, and so forth through task (n). The compute service manger 102 receives the job at 106 and determines tasks at 108 that may be carried out to execute the job 104. The compute service manager 102 is configured to determine the one or more tasks, such as task 0, task 1, task 2, task 3, and so forth, based on applicable rules and/or parameters. The compute service manager assigns tasks at 110. In an implementation, the compute service manager 102 may assume a client role at 112 to act on client data. The job 104 is carried out by a query manager 114 of the compute service manager 102. The query manager 114 may have multiple threads, including for example query manager threads 114a, 114b, 114c, and so forth. The compute service manager 102 may provide the job 104, including the multiple discrete tasks, to the execution platform 116 for the job to be executed. The compute service manager 102 may assign each of the multiple discrete tasks to various execution nodes of the execution platform 116.

The compute service manager 102 determines one or more discrete tasks to be executed to carry out a job 104. A task is a portion of work that may be scheduled for execution by the execution platform 116. The job 104 may include a state that can be serialized for storage, a means to deserialize that state, and a set of methods that operate based on that state to produce the one or more discrete tasks and make decisions concerning how to deal with, for example, errors, failures, state transitions, and so forth. The state may reside in persistent storage and may be updated to reflect a job that is executed by the compute service manager 102.

In an embodiment, the compute service manager 102 schedules and manages the execution of queries on behalf of a client account. The compute service manager 102 may schedule any arbitrary SQL query. The compute service manager 102 may assume a role to schedule the job 104 as if it is the client account rather than as an internal account or other special account. The compute service manager 102 may embody the role of, for example, an account administrator or a role having the smallest scope necessary to complete the intended job 104. In an embodiment, the compute service manager 102 embodies the role that owns the object that is the target of the job 104, e.g. for a cluster, the table being clustered. In an embodiment, the compute service manager 102 receives the job 104 and the job 104 specifies a domain or identification of the object that will be operated on. From that domain or identification, the compute service manager 102 resolves the object and assumes the appropriate role identification. In an embodiment, the compute service manager 102 assumes a role of a special "compute service user" that is not visible to or usable by a client account.

The compute service manager 102 determines tasks at 108 and assigns tasks at 110. The compute service manager 102 generates one or more discrete units of work that may be referred to as a task. The task includes, for example, a task type, a task identification, an account identification, a payload which may be converted to one or more discrete tasks, and a set of options that control how the job 104 behaves (e.g. indicates a number of retries). The task includes a "state" that identifies where in the task lifecycle a given task is. The persistent state for a task may be split between values that are hard coded into persistent data storage and a task implementation-specific object that is deserialized when operating on the task object in memory. This may permit the task persistent data storage to be relatively simple when permitting individual implementers to store arbitrary information about their associated tasks. The task namespace includes an index class that groups information for concrete implementations of a scheduled task, including a class object for the concrete implementation, an object domain for the task, and any other information that is pertinent to the task type.

The compute service manager 102 may generate and assign a task continuation and/or a child task. In certain implementations, a task may require multiple iterations before converging to a completed state. In such an implementation, a task may only be a portion of a larger piece of work that requires running many such tasks serially to be completed. This may be accommodated by generating successor tasks that are initiated when a task is successfully completed. The successor task is atomically scheduled during state transition from "executing" (see 608 in FIG. 6) to "completed success" (see 610 in FIG. 6) and is marked with the identification of the parent task such that a lineage for the task may be reviewed. A callback for a successor task may be run with the same account, role, user, and/or session of the parent task that it is being called for.

In an embodiment, the job 104 is fail-safe and has a life cycle that begins when the one or more discrete tasks are scheduled to be executed and/or assigned to the execution platform 116. In an embodiment, the one or more discrete tasks may be scheduled via an application program interface (API).

In an embodiment, the compute service manager 102 receives a job at 108 by way of an internal mechanism, and the job 104 is not received directly from a client account. In an alternative embodiment, the job 104 is received directly from a client account. Where the job 104 is determined and received by way of an internal mechanism, the job 104 may include a "behind the scenes" operation that improves the management or organization of database data. Such internal jobs include, for example, clustering or reclustering database data, refreshing a materialized view based on an updated source table, compacting one or more database tables or micro-partitions, executing a storage procedure service, and upgrading files or micro-partitions in database table. The compute service manager 102 may receive such a job at 106 based on a trigger event. In an example implementation, where the compute service manager 102 receives a job to refresh a materialized view, the trigger event may be the updating or refreshing of the source table for the materialized view. In an additional example implementation, where the compute service manager 102 receives a job to recluster database data, the trigger event may be that a table has fallen below a predefined clustering threshold or that new data is ingested into a database table. In an implementation, the compute service manager schedules and manages internal jobs that improve database operations, database organization, and database query performance, and does not schedule or manage the execution of a query (such as a SQL statement) that is received from a user or client account.

The compute service manager 102 is configured to determine one or more discrete tasks at 108 that must be performed to fully execute the job 104. In an embodiment, the one or more discrete tasks do not have any ordering constraints and may be executed in parallel or in any other order. In another embodiment, the compute service manager 102 assigns ordering constraints to any number of the one or more discrete tasks, where applicable. Depending on the constraints of the job 104, the compute service manager 102 may determine that one or more of multiple discrete tasks must be serialized and executed in a particular order.

In an embodiment, the compute service manager 102 generates a report indicating when a job 104 is scheduled to be executed and how much computing resources are estimated to be tied up executing the job 104. The compute service manager 102 may generate a statement for each task that exposes the job 104 to an applicable client account by way of a filter. The compute service manager 102 may alert a client account when a job 104 is being executed particularly where the job 104 uses a customer-managed key.

Figure 2:
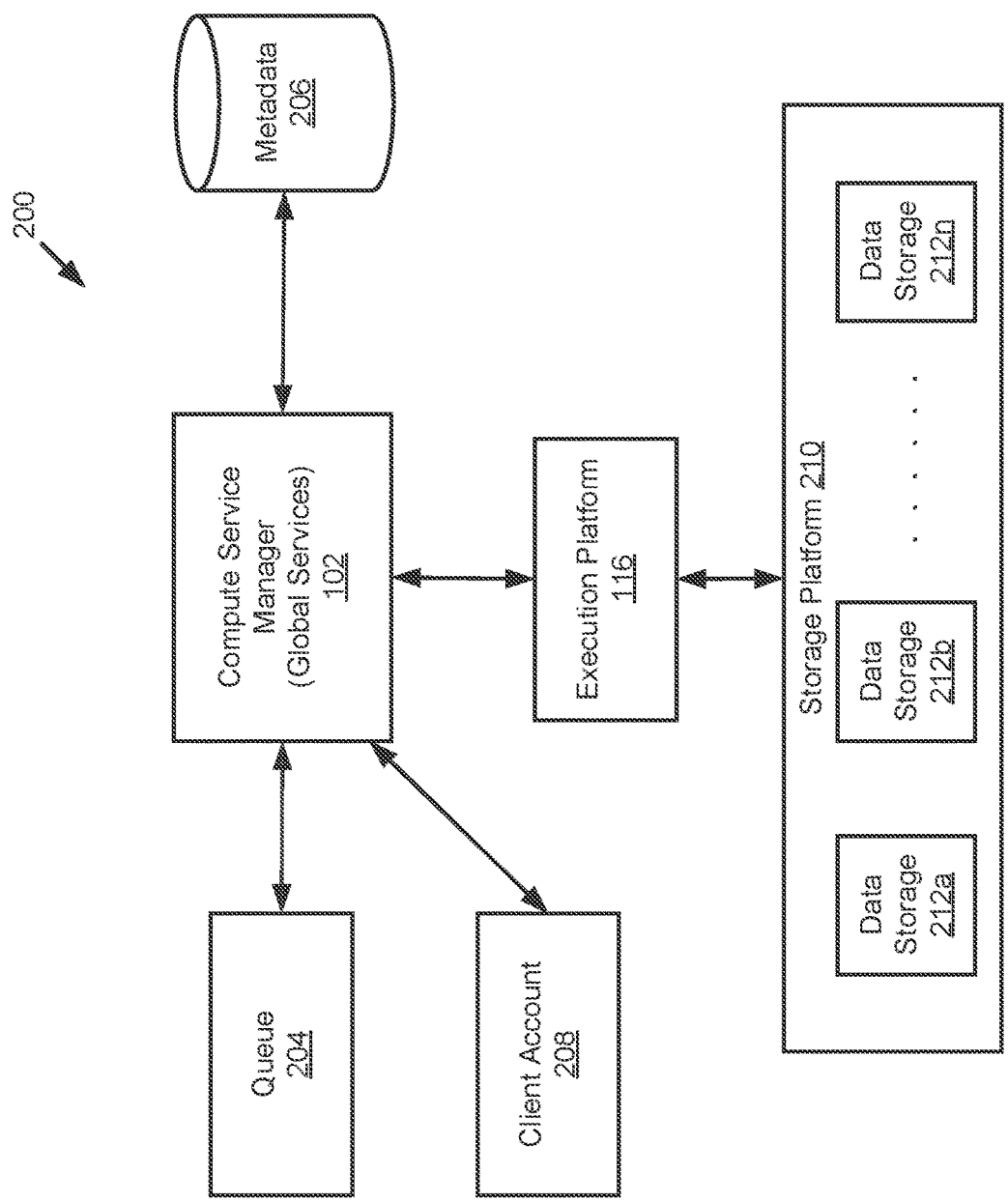
FIG. 2 is a block diagram illustrating a data processing platform, according to one embodiment of the disclosure.

FIG. 2 is a block diagram depicting an example embodiment of a data processing platform 200. As shown in FIG. 2, a compute service manager 102 is in communication with a queue 204, a client account 208, metadata 206, and an execution platform 116. In an embodiment, the compute service manager 102 does not receive any direct communications from a client account 208 and only receives communications concerning jobs from the queue 204. In particular implementations, the compute service manager 102 can support any number of client accounts 208 such as end users providing data storage and retrieval requests, system administrators managing the systems and methods described herein, and other components/devices that interact with compute service manager 102. As used herein, compute service manager 102 may also be referred to as a "global services system" that performs various functions as discussed herein.

The compute service manager 102 is in communication with a queue 204. The queue 204 may provide a job to the compute service manager 102 in response to a trigger event. One or more jobs may be stored in the queue 204 in an order of receipt and/or an order of priority, and each of those one or more jobs may be communicated to the compute service manager 102 to be scheduled and executed. The queue 204 may determine a job to be performed based on a trigger event such as the ingestion of data, deleting one or more rows in a table, updating one or more rows in a table, a materialized view becoming stale with respect to its source table, a table reaching a predefined clustering threshold indicating the table should be reclustered, and so forth. The queue 204 may determine internal jobs that should be performed to improve the performance of the database and/or to improve the organization of database data. In an embodiment, the queue 204 does not store queries to be executed for a client account but instead only includes stores database jobs that improve database performance.

The compute service manager 102 is also coupled to metadata 206, which is associated with the entirety of data stored throughout data processing platform 200. In some embodiments, metadata 206 includes a summary of data stored in remote data storage systems as well as data available from a local cache. Additionally, metadata 206 may include information regarding how data is organized in the remote data storage systems and the local caches. Metadata 206 allows systems and services to determine whether a piece of data needs to be accessed without loading or accessing the actual data from a storage device.

In an embodiment, the compute service manager 102 and/or the queue 204 may determine that a job should be performed based on the metadata 206. In such an embodiment, the compute service manager 102 and/or the queue 204 may scan the metadata 206 and determine that a job should be performed to improve data organization or database performance. For example, the compute service manager 102 and/or the queue 204 may determine that a new version of a source table for a materialized view has been generated and the materialized view has not been refreshed to reflect the new version of the source table. The metadata 206 may include a transactional change tracking stream indicating when the new version of the source table was generated and when the materialized view was last refreshed. Based on that metadata 206 transaction stream, the compute service manager 102 and/or the queue 204 may determine that a job should be performed. In an embodiment, the compute service manager 102 determines that a job should be performed based on a trigger event and stores the job in the queue 204 until the compute service manager 102 is ready to schedule and manage the execution of the job.

The compute service manager 102 may receive rules or parameters from the client account 208 and such rules or parameters may guide the compute service manager 102 in scheduling and managing internal jobs. The client account 208 may indicate that internal jobs should only be executed at certain times or should only utilize a set maximum amount of processing resources. The client account 208 may further indicate one or more trigger events that should prompt the compute service manager 102 to determine that a job should be performed. The client account 208 may provide parameters concerning how many times a task may be re-executed and/or when the task should be re-executed.

The compute service manager 102 is further coupled to an execution platform 116, which provides multiple computing resources that execute various data storage and data retrieval tasks, as discussed in greater detail below. Execution platform 116 is coupled to multiple data storage devices 212a, 212b, and 212n that are part of a storage platform 210. Although three data storage devices 212a, 212b, and 212n are shown in FIG. 2, execution platform 116 is capable of communicating with any number of data storage devices. In some embodiments, data storage devices 212a, 212b, and 212n are cloud-based storage devices located in one or more geographic locations. For example, data storage devices 212a, 212b, and 212n may be part of a public cloud infrastructure or a private cloud infrastructure. Data storage devices 212a, 212b, and 212n may be hard disk drives (HDDs), solid state drives (SSDs), storage clusters, Amazon S3™ storage systems or any other data storage technology. Additionally, storage platform 210 may include distributed file systems (such as Hadoop Distributed File Systems (HDFS)), object storage systems, and the like.

In particular embodiments, the communication links between compute service manager 102, the queue 204, metadata 206, the client account 208, and the execution platform 116 are implemented via one or more data communication networks. Similarly, the communication links between execution platform 116 and data storage devices 212a-212n in the storage platform 210 are implemented via one or more data communication networks. These data communication networks may utilize any communication protocol and any type of communication medium. In some embodiments, the data communication networks are a combination of two or more data communication networks (or sub-networks) coupled to one another. In alternate embodiments, these communication links are implemented using any type of communication medium and any communication protocol.

As shown in FIG. 2, data storage devices 212a, 212b, and 212n are decoupled from the computing resources associated with the execution platform 116. This architecture supports dynamic changes to data processing platform 200 based on the changing data storage/retrieval needs as well as the changing needs of the users and systems accessing data processing platform 200. The support of dynamic changes allows data processing platform 200 to scale quickly in response to changing demands on the systems and components within data processing platform 200. The decoupling of the computing resources from the data storage devices supports the storage of large amounts of data without requiring a corresponding large amount of computing resources. Similarly, this decoupling of resources supports a significant increase in the computing resources utilized at a particular time without requiring a corresponding increase in the available data storage resources.

Compute service manager 102, queue 204, metadata 206, client account 208, execution platform 116, and storage platform 210 are shown in FIG. 2 as individual components. However, each of compute service manager 102, queue 204, metadata 206, client account 208, execution platform 116, and storage platform 210 may be implemented as a distributed system (e.g., distributed across multiple systems/platforms at multiple geographic locations). Additionally, each of compute service manager 102, metadata 206, execution platform 116, and storage platform 210 can be scaled up or down (independently of one another) depending on changes to the requests received from the queue 204 and/or client accounts 208 and the changing needs of data processing platform 200. Thus, in the described embodiments, data processing platform 200 is dynamic and supports regular changes to meet the current data processing needs.

During typical operation, data processing platform 200 processes multiple jobs received from the queue 204 or determined by the compute service manager 102. These jobs are scheduled and managed by the compute service manager 102 to determine when and how to execute the job. For example, the compute service manager 102 may divide the job into multiple discrete tasks and may determine what data is needed to execute each of the multiple discrete tasks. The compute service manager 102 may assign each of the multiple discrete tasks to one or more nodes of the execution platform 116 to process the task. The compute service manager 102 may determine what data is needed to process a task and further determine which nodes within the execution platform 116 are best suited to process the task. Some nodes may have already cached the data needed to process the task and, therefore, be a good candidate for processing the task. Metadata 206 assists the compute service manager 102 in determining which nodes in the execution platform 116 have already cached at least a portion of the data needed to process the task. One or more nodes in the execution platform 116 process the task using data cached by the nodes and, if necessary, data retrieved from the storage platform 210. It is desirable to retrieve as much data as possible from caches within the execution platform 116 because the retrieval speed is typically much faster than retrieving data from the storage platform 210.

As shown in FIG. 2, the data processing platform 200 separates the execution platform 116 from the storage platform 210. In this arrangement, the processing resources and cache resources in the execution platform 116 operate independently of the data storage resources 212a-212n in the storage platform 210. Thus, the computing resources and cache resources are not restricted to specific data storage resources 212a-212n. Instead, all computing resources and all cache resources may retrieve data from, and store data to, any of the data storage resources in the storage platform 210. Additionally, the data processing platform 200 supports the addition of new computing resources and cache resources to the execution platform 116 without requiring any changes to the storage platform 210. Similarly, the data processing platform 200 supports the addition of data storage resources to the storage platform 210 without requiring any changes to nodes in the execution platform 116.

Figure 3:
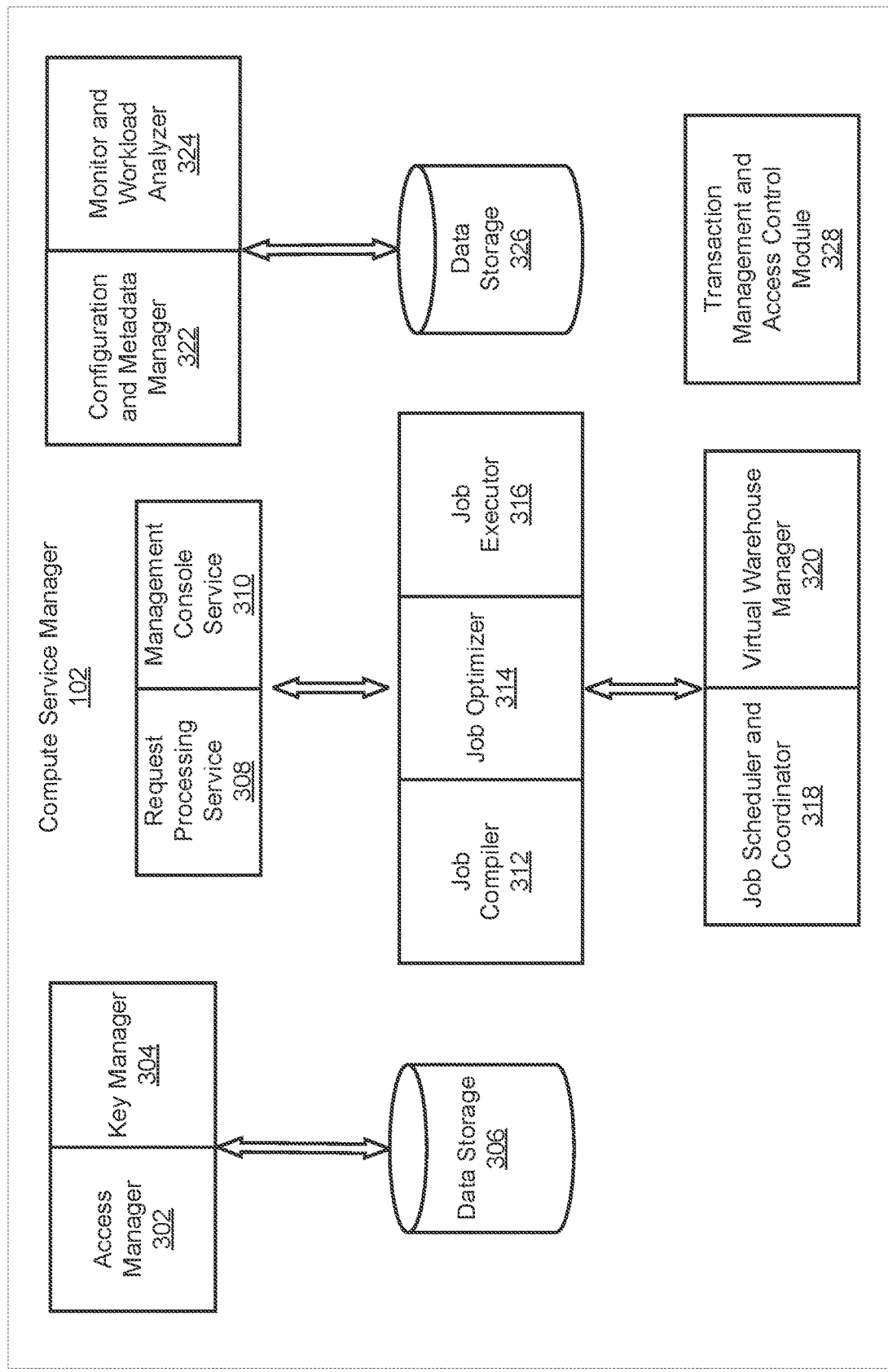
FIG. 3 is a block diagram illustrating a compute service manager, according to one embodiment of the disclosure.

FIG. 3 is a block diagram depicting an embodiment of the compute service manager 102. As shown in FIG. 3, the compute service manager 102 includes an access manager 302 and a key manager 304 coupled to a data storage device 306. Access manager 302 handles authentication and authorization tasks for the systems described herein. Key manager 304 manages storage and authentication of keys used during authentication and authorization tasks. For example, access manager 302 and key manager 304 manage the keys used to access data stored in remote storage devices (e.g., data storage devices in storage platform 210). As used herein, the remote storage devices may also be referred to as "persistent storage devices" or "shared storage devices." A request processing service 308 manages received data storage requests and data retrieval requests (e.g., jobs to be performed on database data). For example, the request processing service 308 may determine the data necessary to process the received data storage request or data retrieval request. The necessary data may be stored in a cache within the execution platform 116 (as discussed in greater detail below) or in a data storage device in storage platform 210. A management console service 310 supports access to various systems and processes by administrators and other system managers. Additionally, the management console service 310 may receive a request to execute a job and monitor the workload on the system.

The compute service manager 102 also includes a job compiler 312, a job optimizer 314 and a job executor 310. The job compiler 312 parses a job into multiple discrete tasks and generates the execution code for each of the multiple discrete tasks. The job optimizer 314 determines the best method to execute the multiple discrete tasks based on the data that needs to be processed. The job optimizer 314 also handles various data pruning operations and other data optimization techniques to improve the speed and efficiency of executing the job. The job executor 316 executes the execution code for jobs received from the queue 204 or determined by the compute service manager 102.

A job scheduler and coordinator 318 sends received jobs to the appropriate services or systems for compilation, optimization, and dispatch to the execution platform 116. For example, jobs may be prioritized and processed in that prioritized order. In an embodiment, the job scheduler and coordinator 318 determines a priority for internal jobs that are scheduled by the compute service manager 102 with other "outside" jobs such as user queries that may be scheduled by other systems in the database but may utilize the same processing resources in the execution platform 116. In some embodiments, the job scheduler and coordinator 318 identifies or assigns particular nodes in the execution platform 116 to process particular tasks. A virtual warehouse manager 320 manages the operation of multiple virtual warehouses implemented in the execution platform 116. As discussed below, each virtual warehouse includes multiple execution nodes that each include a cache and a processor.

Additionally, the compute service manager 102 includes a configuration and metadata manager 322, which manages the information related to the data stored in the remote data storage devices and in the local caches (i.e., the caches in execution platform 116). As discussed in greater detail below, the configuration and metadata manager 322 uses the metadata to determine which data files need to be accessed to retrieve data for processing a particular task or job. A monitor and workload analyzer 324 oversees processes performed by the compute service manager 102 and manages the distribution of tasks (e.g., workload) across the virtual warehouses and execution nodes in the execution platform 116. The monitor and workload analyzer 324 also redistributes tasks, as needed, based on changing workloads throughout the data processing platform 200 and may further redistribute tasks based on a user (i.e. "external") query workload that may also be processed by the execution platform 116. The configuration and metadata manager 322 and the monitor and workload analyzer 324 are coupled to a data storage device 326. Data storage devices 306 and 326 in FIG. 3 represent any data storage device within data processing platform 200. For example, data storage devices 306 and 326 may represent caches in execution platform 116, storage devices in storage platform 210, or any other storage device.

The compute service manager 102 also includes a transaction management and access control module 328, which manages the various tasks and other activities associated with the processing of data storage requests and data access requests. For example, transaction management and access control module 328 provides consistent and synchronized access to data by multiple users or systems. Since multiple users/systems may access the same data simultaneously, changes to the data must be synchronized to ensure that each user/system is working with the current version of the data. Transaction management and access control module 328 provides control of various data processing activities at a single, centralized location in the compute service manager 102. In some embodiments, the transaction management and access control module 328 interacts with the job executor 316 to support the management of various tasks being executed by the job executor 316.

Figure 4:
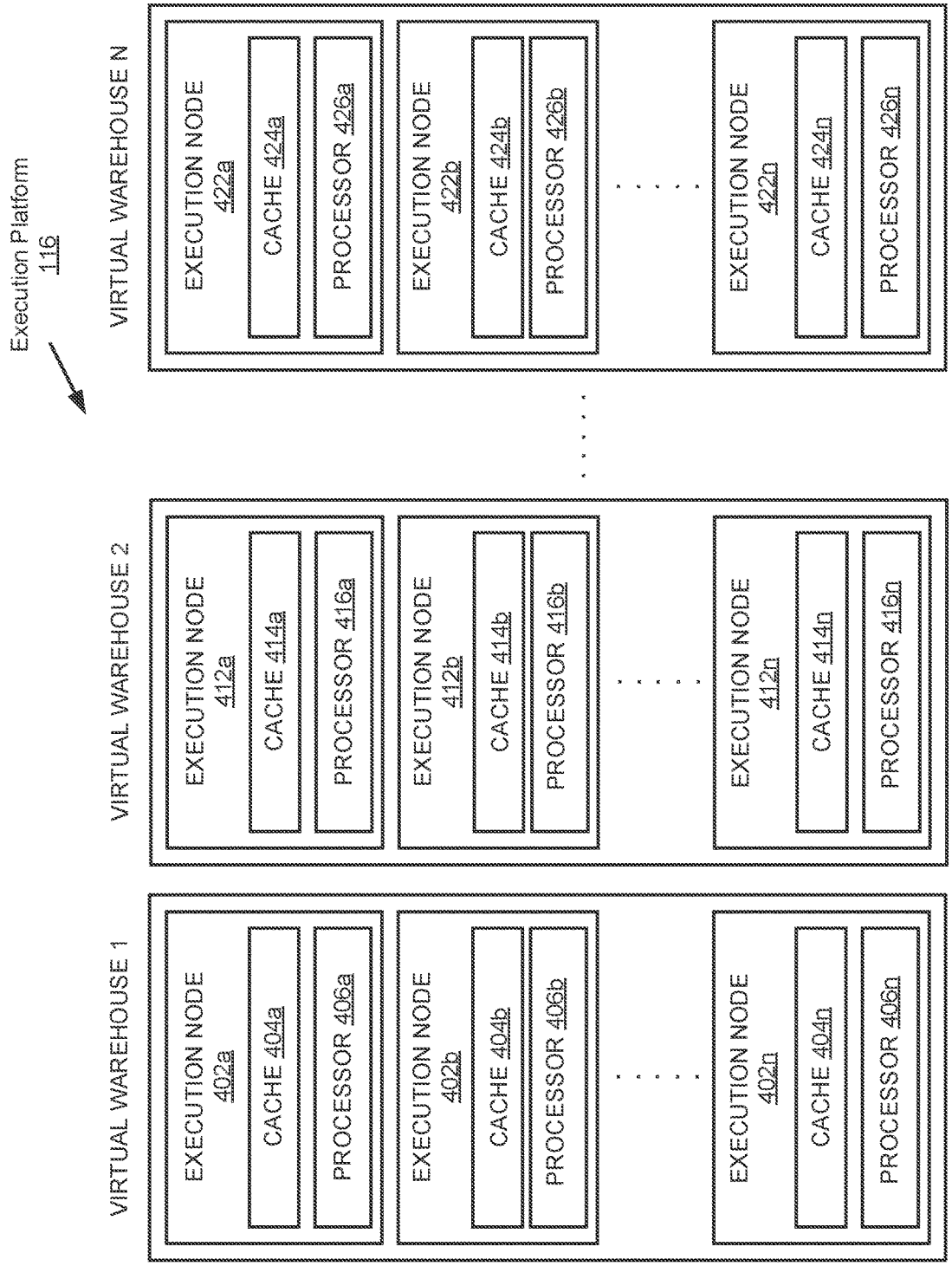
FIG. 4 is a block diagram illustrating an execution platform according to one embodiment of the disclosure.

FIG. 4 is a block diagram depicting an embodiment of an execution platform 116. As shown in FIG. 4, execution platform 116 includes multiple virtual warehouses, including virtual warehouse 1, virtual warehouse 2, and virtual warehouse n. Each virtual warehouse includes multiple execution nodes that each include a data cache and a processor. The virtual warehouses can execute multiple tasks in parallel by using the multiple execution nodes. As discussed herein, execution platform 116 can add new virtual warehouses and drop existing virtual warehouses in real-time based on the current processing needs of the systems and users. This flexibility allows the execution platform 116 to quickly deploy large amounts of computing resources when needed without being forced to continue paying for those computing resources when they are no longer needed. All virtual warehouses can access data from any data storage device (e.g., any storage device in storage platform 210).

Although each virtual warehouse shown in FIG. 4 includes three execution nodes, a particular virtual warehouse may include any number of execution nodes. Further, the number of execution nodes in a virtual warehouse is dynamic, such that new execution nodes are created when additional demand is present, and existing execution nodes are deleted when they are no longer necessary.

Each virtual warehouse is capable of accessing any of the data storage devices 310a-310n shown in FIG. 3. Thus, the virtual warehouses are not necessarily assigned to a specific data storage device 212a-212n and, instead, can access data from any of the data storage devices 212a-212n within the storage platform 210. Similarly, each of the execution nodes shown in FIG. 4 can access data from any of the data storage devices 212a-212n. In some embodiments, a particular virtual warehouse or a particular execution node may be temporarily assigned to a specific data storage device, but the virtual warehouse or execution node may later access data from any other data storage device.

In the example of FIG. 4, virtual warehouse 1 includes three execution nodes 402a, 402b, and 402n. Execution node 402a includes a cache 404a and a processor 406a. Execution node 402b includes a cache 404b and a processor 406b. Execution node 402n includes a cache 404n and a processor 406n. Each execution node 402a, 402b, and 402n is associated with processing one or more data storage and/or data retrieval tasks. For example, a virtual warehouse may handle data storage and data retrieval tasks associated with an internal service, such as a clustering service, a materialized view refresh service, a file compaction service, a storage procedure service, or a file upgrade service. In other implementations, a particular virtual warehouse may handle data storage and data retrieval tasks associated with a particular data storage system or a particular category of data.

Similar to virtual warehouse 1 discussed above, virtual warehouse 2 includes three execution nodes 412a, 412b, and 412n. Execution node 412a includes a cache 414a and a processor 416a. Execution node 412b includes a cache 414b and a processor 416b. Execution node 412n includes a cache 414n and a processor 416n. Additionally, virtual warehouse 3 includes three execution nodes 422a, 422b, and 422n. Execution node 422a includes a cache 424a and a processor 426a. Execution node 422b includes a cache 424b and a processor 426b. Execution node 422n includes a cache 424n and a processor 426n.

In some embodiments, the execution nodes shown in FIG. 4 are stateless with respect to the data the execution nodes are caching. For example, these execution nodes do not store or otherwise maintain state information about the execution node, or the data being cached by a particular execution node. Thus, in the event of an execution node failure, the failed node can be transparently replaced by another node. Since there is no state information associated with the failed execution node, the new (replacement) execution node can easily replace the failed node without concern for recreating a particular state.

Although the execution nodes shown in FIG. 4 each include one data cache and one processor, alternate embodiments may include execution nodes containing any number of processors and any number of caches. Additionally, the caches may vary in size among the different execution nodes. The caches shown in FIG. 4 store, in the local execution node, data that was retrieved from one or more data storage devices in storage platform 210. Thus, the caches reduce or eliminate the bottleneck problems occurring in platforms that consistently retrieve data from remote storage systems. Instead of repeatedly accessing data from the remote storage devices, the systems and methods described herein access data from the caches in the execution nodes which is significantly faster and avoids the bottleneck problem discussed above. In some embodiments, the caches are implemented using high-speed memory devices that provide fast access to the cached data. Each cache can store data from any of the storage devices in the storage platform 210.

Further, the cache resources and computing resources may vary between different execution nodes. For example, one execution node may contain significant computing resources and minimal cache resources, making the execution node useful for tasks that require significant computing resources. Another execution node may contain significant cache resources and minimal computing resources, making this execution node useful for tasks that require caching of large amounts of data. Yet another execution node may contain cache resources providing faster input-output operations, useful for tasks that require fast scanning of large amounts of data. In some embodiments, the cache resources and computing resources associated with a particular execution node are determined when the execution node is created, based on the expected tasks to be performed by the execution node.

Additionally, the cache resources and computing resources associated with a particular execution node may change over time based on changing tasks performed by the execution node. For example, an execution node may be assigned more processing resources if the tasks performed by the execution node become more processor-intensive. Similarly, an execution node may be assigned more cache resources if the tasks performed by the execution node require a larger cache capacity.

Although virtual warehouses 1, 2, and n are associated with the same execution platform 116, the virtual warehouses may be implemented using multiple computing systems at multiple geographic locations. For example, virtual warehouse 1 can be implemented by a computing system at a first geographic location, while virtual warehouses 2 and n are implemented by another computing system at a second geographic location. In some embodiments, these different computing systems are cloud-based computing systems maintained by one or more different entities.

Additionally, each virtual warehouse is shown in FIG. 4 as having multiple execution nodes. The multiple execution nodes associated with each virtual warehouse may be implemented using multiple computing systems at multiple geographic locations. For example, an instance of virtual warehouse 1 implements execution nodes 402a and 402b on one computing platform at a geographic location and implements execution node 402n at a different computing platform at another geographic location. Selecting particular computing systems to implement an execution node may depend on various factors, such as the level of resources needed for a particular execution node (e.g., processing resource requirements and cache requirements), the resources available at particular computing systems, communication capabilities of networks within a geographic location or between geographic locations, and which computing systems are already implementing other execution nodes in the virtual warehouse.

Execution platform 116 is also fault tolerant. For example, if one virtual warehouse fails, that virtual warehouse is quickly replaced with a different virtual warehouse at a different geographic location.

A particular execution platform 116 may include any number of virtual warehouses. Additionally, the number of virtual warehouses in a particular execution platform is dynamic, such that new virtual warehouses are created when additional processing and/or caching resources are needed. Similarly, existing virtual warehouses may be deleted when the resources associated with the virtual warehouse are no longer necessary.

In some embodiments, the virtual warehouses may operate on the same data in storage platform 210, but each virtual warehouse has its own execution nodes with independent processing and caching resources. This configuration allows requests on different virtual warehouses to be processed independently and with no interference between the requests. This independent processing, combined with the ability to dynamically add and remove virtual warehouses, supports the addition of new processing capacity for new users without impacting the performance observed by the existing users.

Figure 5:
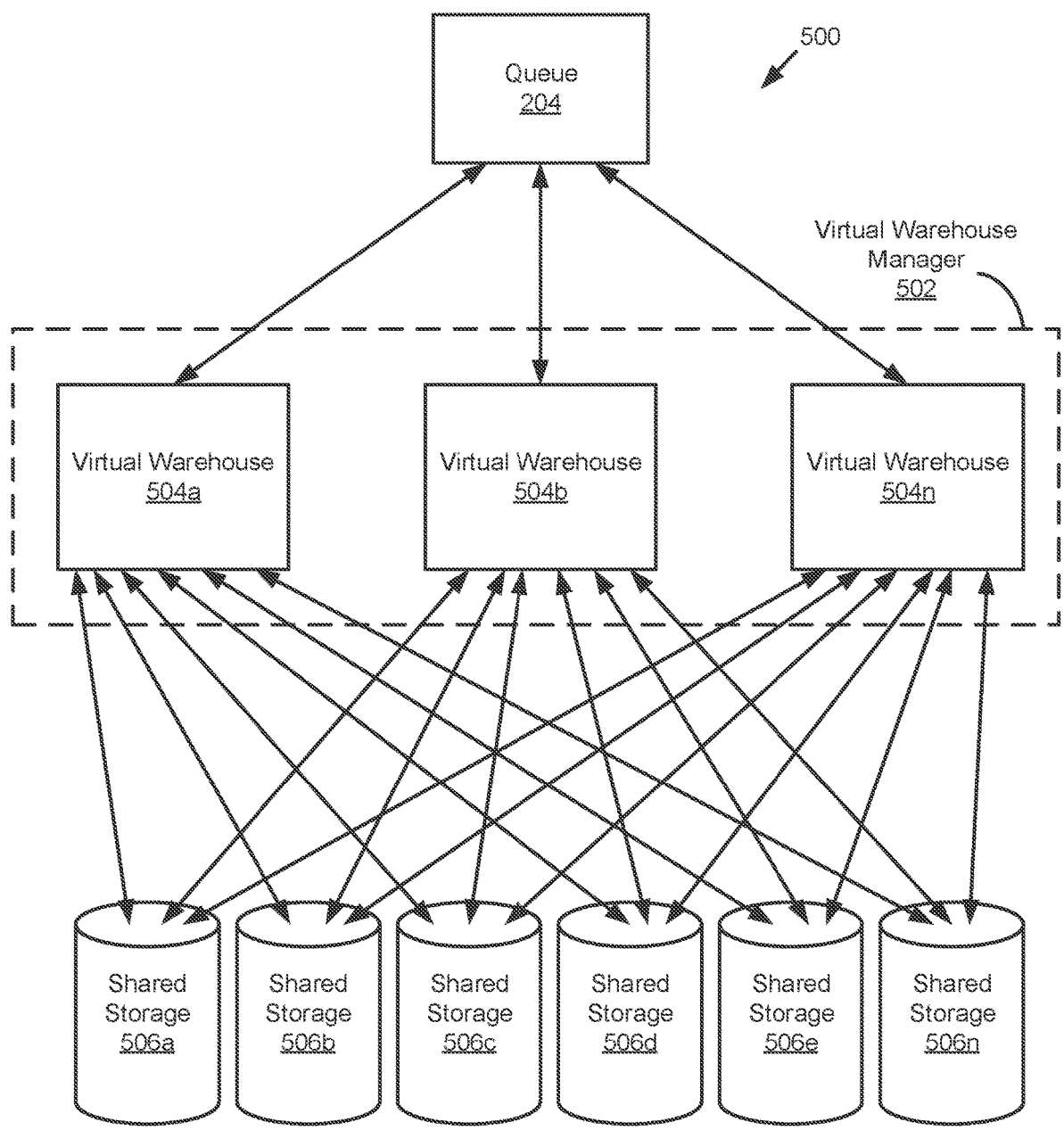
FIG. 5 is a block diagram illustrating an example operating environment according to one embodiment of the disclosure.

FIG. 5 is a block diagram depicting an example operating environment 500 with the queue 204 in communication with multiple virtual warehouses under a virtual warehouse manager 502. In environment 500, the queue 204 has access to multiple database shared storage devices 506a, 506b, 506c, 506d, 506e and 506n through multiple virtual warehouses 504a, 504b, and 504n. Although not shown in FIG. 5, the queue 204 may access virtual warehouses 504a, 504b, and 504n through the compute service manager 102 (see FIG. 1). In particular embodiments, databases 506a-506n are contained in the storage platform 210 and are accessible by any virtual warehouse implemented in the execution platform 116. In some embodiments, the queue 204 may access one of the virtual warehouses 504a-504n using a data communication network such as the Internet. In some implementations, a client account may specify that the queue 204 (configured for storing internal jobs to be completed) should interact with a particular virtual warehouse 504a-504n at a particular time.

In an embodiment (as illustrated), each virtual warehouse 504a-504n can communicate with all databases 506a-506n. In some embodiments, each virtual warehouse 504a-504n is configured to communicate with a subset of all databases 506a-506n. In such an arrangement, an individual client account associated with a set of data may send all data retrieval and data storage requests through a single virtual warehouse and/or to a certain subset of the databases 506a-506n. Further, where a certain virtual warehouse 504a-504n is configured to communicate with a specific subset of databases 506a-506n, the configuration is dynamic. For example, virtual warehouse 504a may be configured to communicate with a first subset of databases 506a-506n and may later be reconfigured to communicate with a second subset of databases 506a-506n.

In an embodiment, the queue 204 sends data retrieval, data storage, and data processing requests to the virtual warehouse manager 502, which routes the requests to an appropriate virtual warehouse 504a-504n. In some implementations, the virtual warehouse manager 502 provides a dynamic assignment of jobs to the virtual warehouses 504a-504n.

In some embodiments, fault tolerance systems create a new virtual warehouse in response to a failure of a virtual warehouse. The new virtual warehouse may be in the same virtual warehouse group or may be created in a different virtual warehouse group at a different geographic location.

The systems and methods described herein allow data to be stored and accessed as a service that is separate from computing (or processing) resources. Even if no computing resources have been allocated from the execution platform 116, data is available to a virtual warehouse without requiring reloading of the data from a remote data source. Thus, data is available independently of the allocation of computing resources associated with the data. The described systems and methods are useful with any type of data. In particular embodiments, data is stored in a structured, optimized format. The decoupling of the data storage/access service from the computing services also simplifies the sharing of data among different users and groups. As discussed herein, each virtual warehouse can access any data to which it has access permissions, even at the same time as other virtual warehouses are accessing the same data. This architecture supports running queries without any actual data stored in the local cache. The systems and methods described herein are capable of transparent dynamic data movement, which moves data from a remote storage device to a local cache, as needed, in a manner that is transparent to the user of the system. Further, this architecture supports data sharing without prior data movement since any virtual warehouse can access any data due to the decoupling of the data storage service from the computing service.

Figure 6:
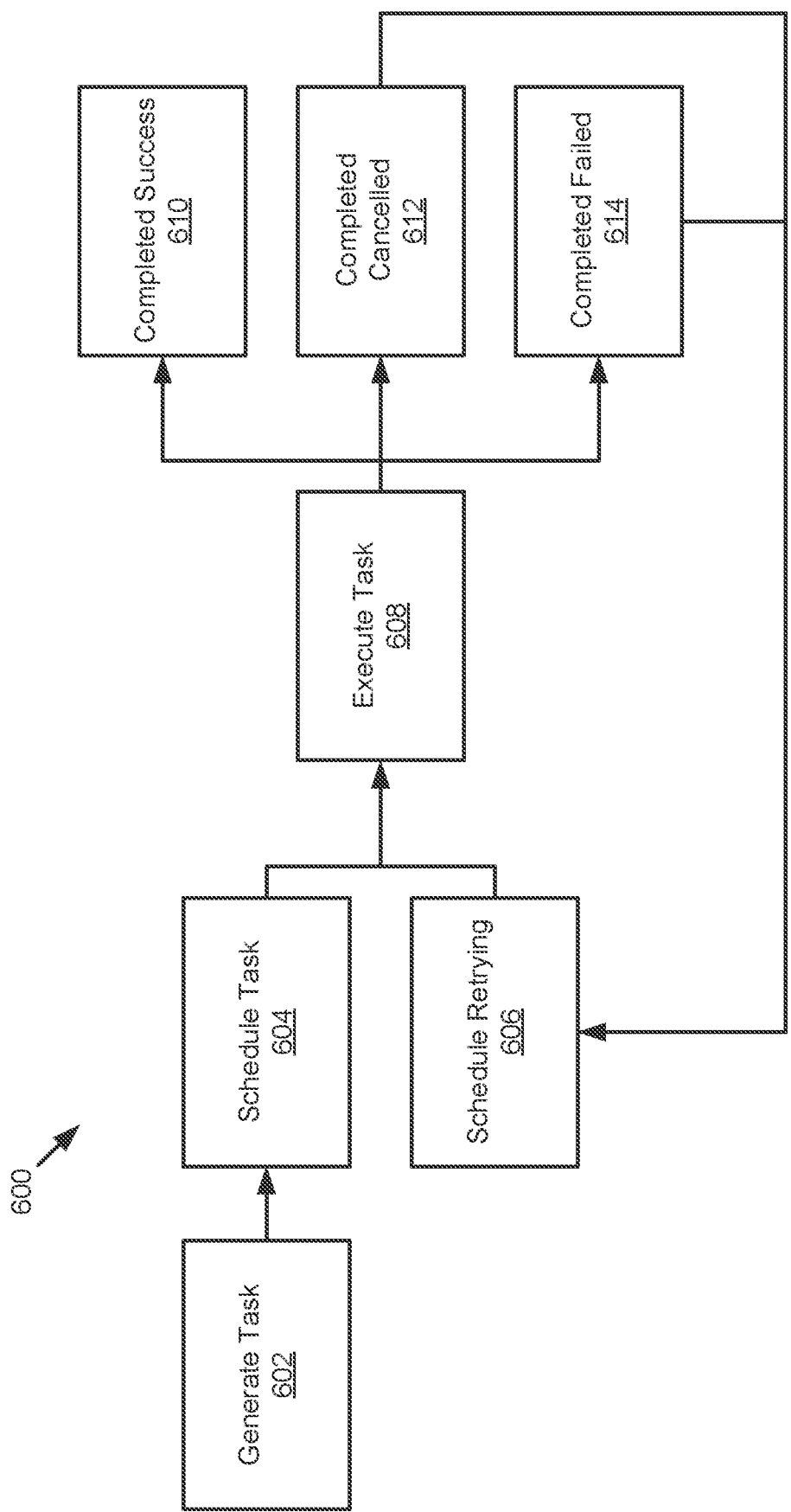
FIG. 6 is a block diagram illustrating an example lifecycle of a task according to one embodiment of the disclosure.

FIG. 6 is a flow diagram depicting an example lifecycle 600 of a task state. The lifecycle 600 includes a series of task states beginning with the states of generate task 602 and schedule task 604. The task state may transition to schedule retrying 606 if the task needs to be rescheduled after it is initially scheduled. During execution, the task state is referred to as execute task 608 and, upon execution, the task state may by any of: completed success 610, completed cancelled 612, or completed failed 614. In response to the task state being completed failed 614 or completed cancelled 612, the task may be rescheduled and transitioned back to a state of schedule retrying 606.

The task state is utilized to track where a given task is in its lifecycle 600. Transitions from one task state to a different task state are illustrated by arrows in FIG. 6. The transitions are atomic and triggered by the compute service manager 102. The task state may be stored as metadata and may be well-defined at all times.

In an implementation, there may be a need to perform task-specific actions outside the context of a SQL statement that is generated for a scheduled task. In an embodiment, a state transition callback is implemented. The state transition callback may be defined by an implementer within a concrete task class and may be called by the compute service manager 102 when a task is transitioned from one state to another. A state transition is atomic but a call for a state transition callback is not. As such, in the event of a fault, it may be necessary to call the state transition callback for a task for which the callback has already been called and either partially or fully completed. Implementations of state transition callbacks may be generated such that if a callback is run twice for a given task, the system is left in a consistent state. The state transition callback may be run without a security context such that it cannot resolve an object.

Figure 7:
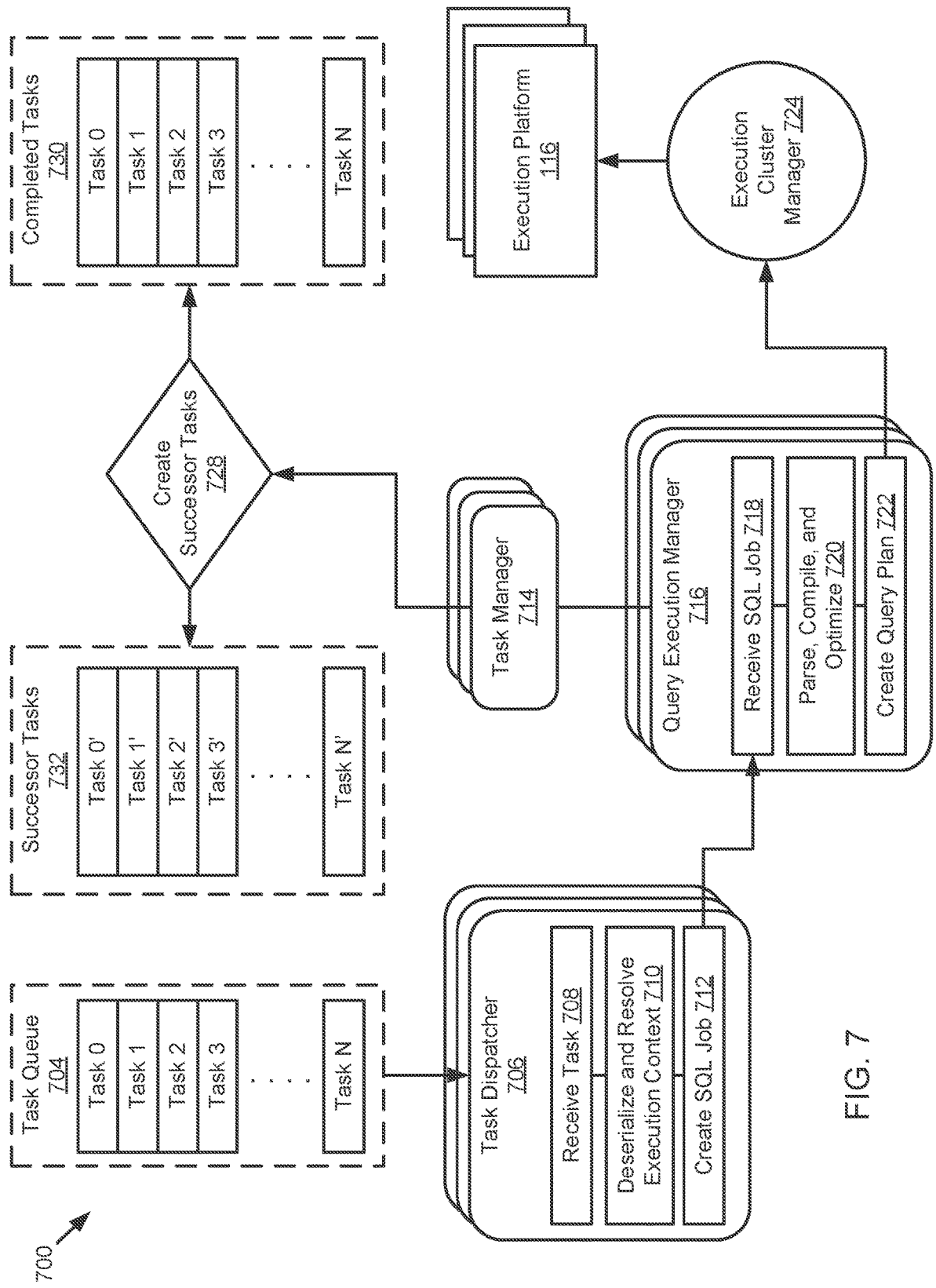
FIG. 7 is a block diagram illustrating an example process flow for scheduling and executing tasks on a database, according to one embodiment of the disclosure.

FIG. 7 is a schematic block diagram of a process flow 700 for scheduling and executing a task on a database. The process flow 700 may be implemented in a cloud-based computing environment that may include a multiple tenant database platform having storage and execution resources that are separate from one another such that each is effectively infinitely scalable. The process flow 700 may be implemented for executing jobs on the database system, where a job includes one or more tasks. The process flow 700 may be implemented by a compute service manager 102 in conjunction with an execution platform 116. The compute service manager 102 may include the task dispatcher 706, the task manager 714, the query execution manager 716, the execution cluster manager 724, a module configured to create successor tasks 728, and other suitable components as described herein.

Units of compute service work may be divided into tasks. As described herein, a task or other unit of compute service work may include an "internal" job to be completed by the compute service manager 102 such that the job is not directly requested by a client or client-facing. Such jobs may include, for example, clustering a table, refreshing a materialized view, updating metadata, updating a secondary deployment to reflect updates made to a primary deployment, updating a change tracking summary, and so forth. The units of compute service work may be divided such that each task (see e.g. task 0, task 1, task 2, task 3 . . . task n) includes enough information to run a Structured Query Language (SQL) query or perform some other piece of work. Tasks can be generated as a direct result of a manual action such as scheduling a SQL query to run at a fixed rate or may be programmatically generated such as automatically reclustering a table in response to an update to the table. The compute service infrastructure may serve as an elastically scalable means of managing and executing tasks.

The life cycle of a task begins when the task is generated. The task may be generated based on the information that is needed to execute the task. For some implementations, such as automatic clustering, automatic materialized view refresh, and so forth, this information includes SQL text that is used to generate a query and the context for the query. The context for the query may include a client account identification within the multiple tenant database system, a role, and/or a user to be used to run that query. The task is scheduled in a task queue 704 for execution. In an embodiment, the task queue 704 is stored in persistent storage.

An individual task in the task queue 704 remains queued until it is dequeued by the task dispatcher 706. As illustrated in FIG. 7, there may exist multiple task dispatchers 706 and the system may effectively include an infinitely scalable number of task dispatchers 706 to service all database data across a multiple tenant database platform. The one or more task dispatchers 706 may be scaled elastically to match throughput into the task queue 704. Once a task has been dequeued, the task dispatcher 706 receives the task at 708. The task dispatcher 706 deserializes and resolves the execution context for the task at 710. The task dispatcher 706 may deserialize the information stored within the task such as the SQL text and/or run context. The task dispatcher 706 generates a SQL job for the task at 712. The task and SQL job record are sent to the query execution manager 716.

The query execution manager 716 receives the task and the SQL job at 718. The query execution manager 716 parses, compiles, and optimizes the SQL job at 720 to generate a plan for executing the SQL job. The query execution manager 716 generates a query plan at 722 for the SQL job. The query plan may include a plurality of discrete subtasks that must be completed to execute the task. The query plan is provided to the execution cluster manager 724. The execution cluster manager 724 decides which execution node (may be referred to as a "cluster") to execute the query on, and the query is provided to that chosen execution node of the execution platform 116. The chosen execution node executes the query. The query execution manager 716 may periodically communicate with the chosen execution node to perform any set of actions necessary for the query and may specifically communicate with the chosen execution node to learn when chosen execution node has finished executing the query.

The execution platform 116 is elastically scalable both in terms of a single execution node to address query latency and the number of execution nodes to address query throughput. If the resources required for a given query are large, the single execution node size might be scaled up to finish a query faster. Likewise, if the number of queries requiring execution increases, the number of execution nodes can be increased to allow for more queries to be executed at one time.

When the query has finished executing, the query execution manager 716 signals to the task manager 714 that the task has been completed. The task manager 714 uses the information stored in the original task (see task 0, task 1, task 2, task 3 . . . task n) to programmatically generate a series of successor tasks 732 such as task 0', task 1', task 2', task 3' . . . task n'. The successor tasks 732 may be a continuation of a parent task or may do something entirely different. Once generated, the successor tasks 732 are scheduled in the tasks queue 704 and the original task is transition to a completed task 730 state. The scheduling of the successor task 732 in the task queue 704 and the transitioning of the original task to the completed task 730 state may happen atomically such that if completing the task must be retried, duplicate successor tasks will not be generated. Once completed, a task is persistently stored in the completed task 730 storage for a set duration to allow task history to be audited for a limited duration. In various implementations, the completed task 730 storage may exist for any suitable duration of time and may or may not be cleared or refreshed based on a time duration.

In an embodiment, the task dispatcher 706, the task manager 714, and the query execution manager 716 are all located on the same physical server and may be scaled elastically to meet task throughput by scaling the number of instances. In an embodiment, the scaling of task dispatcher 706 instances, task manager 714 instances, and query execution manager 716 instances is 1:1 with the number of compute service manager 102 instances.

Figure 8:
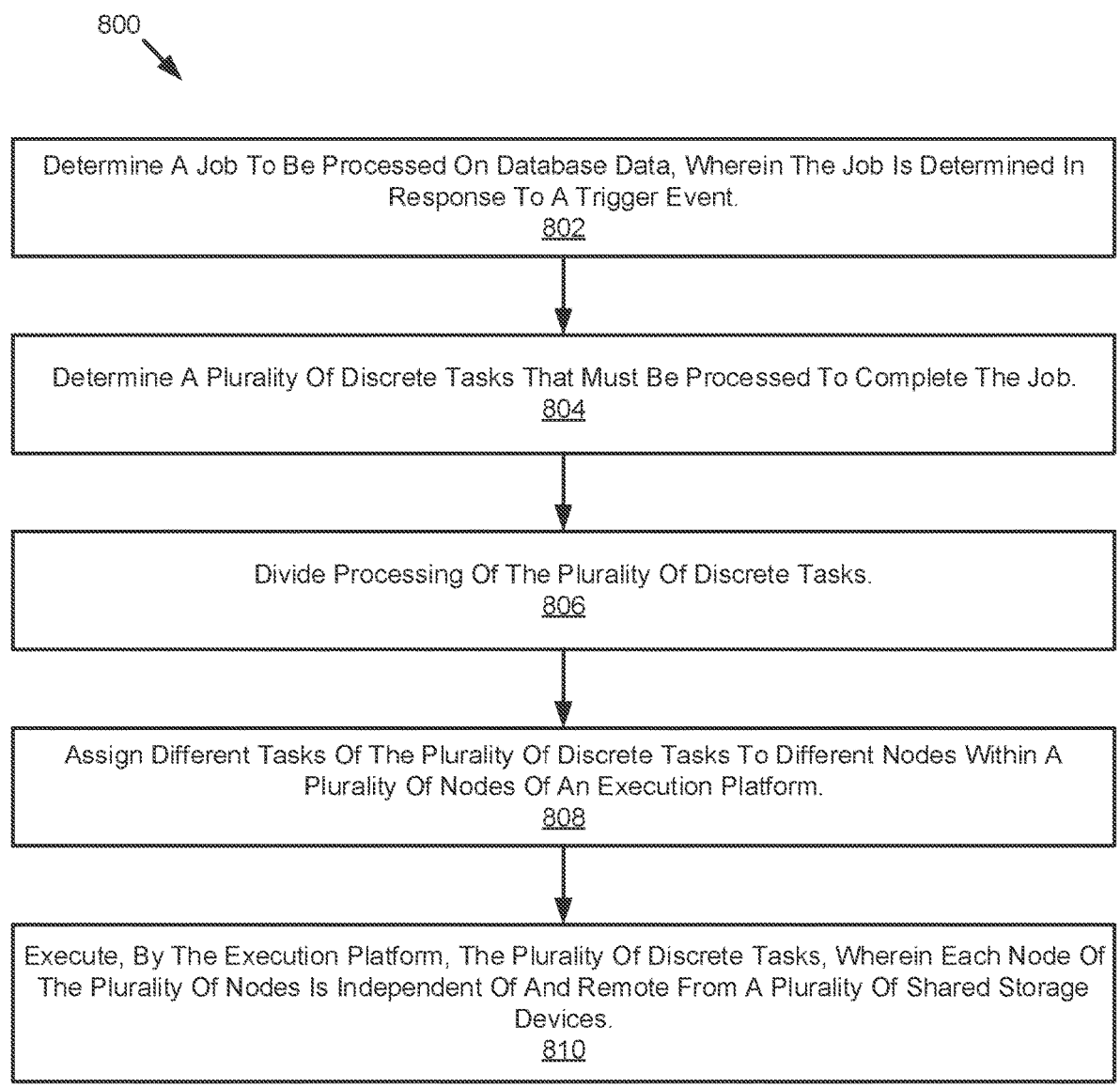
FIG. 8 is a schematic flow chart diagram illustrating a method for scheduling tasks to be executed on a database, according to one embodiment of the disclosure.

FIG. 8 is a flow diagram depicting an embodiment of a method 800 for managing data storage and retrieval operations. The method 800 may be performed by any suitable computing device or system, including for example a compute service manager 102 or data processing platform 200 as disclosed herein.

The method 800 begins and a computing device determines at 802 a job to be processed on database data, wherein the job is determined in response to a trigger event. The computing device determines at 804 a plurality of discrete tasks that must be processed to complete the job. The computing device divides at 806 processing of the plurality of discrete tasks. The computing device assigns at 808 different tasks of the plurality of discrete tasks to different nodes within a plurality of nodes of an execution platform. The computing device executes at 810, by the execution platform, the plurality of discrete tasks, wherein each node of the plurality of nodes is independent of and remote from a plurality of shared storage devices.

Figure 9:
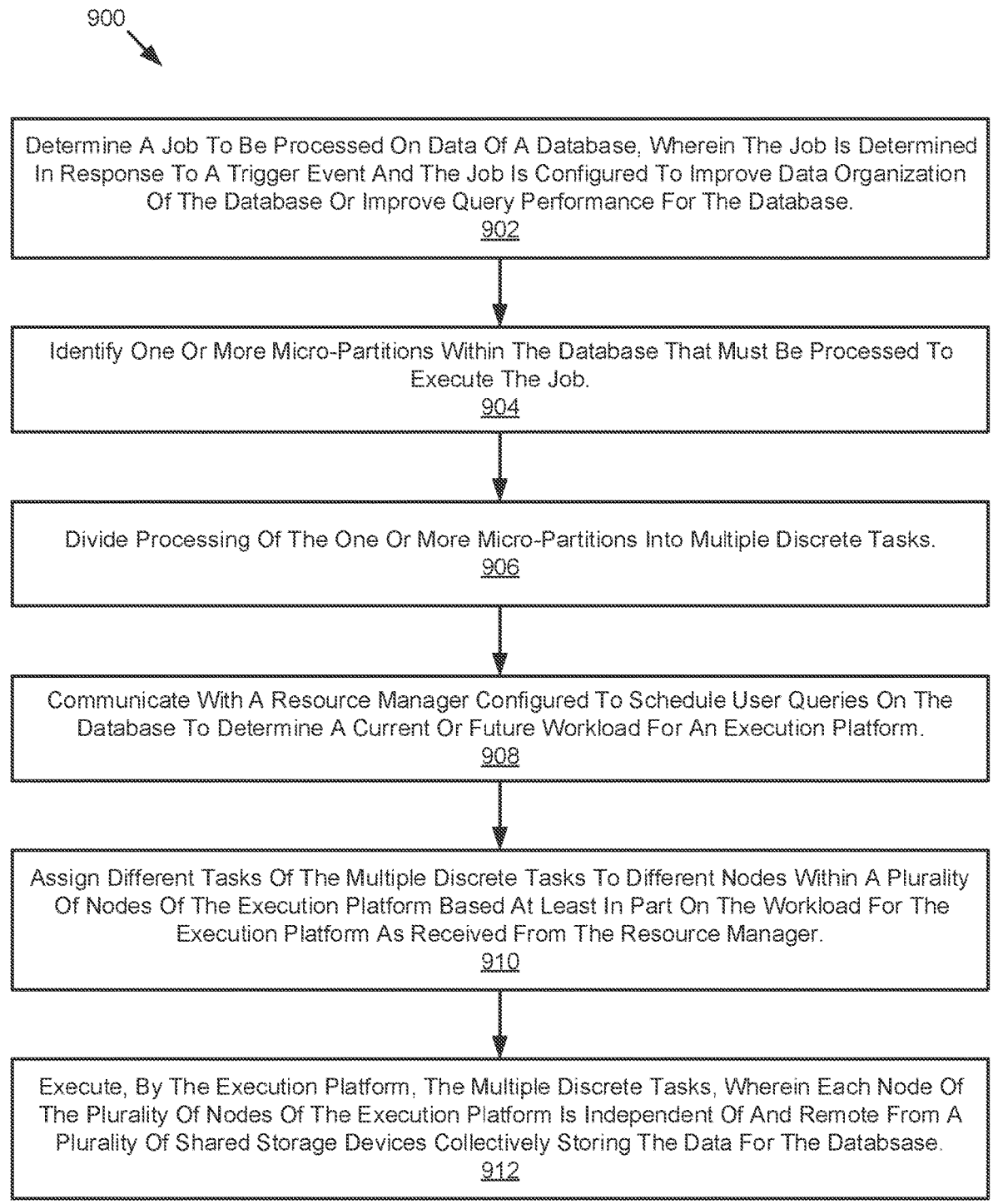
FIG. 9 is a schematic flow chart diagram illustrating a method for scheduling tasks to be executed on a database, according to one embodiment of the disclosure.

FIG. 9 is a flow diagram depicting an embodiment of a method 900 for managing data storage and retrieval operations for an internal database job. The method 900 may be performed by any suitable computing device or system, including for example a compute service manager 102 or data processing platform 200 as disclosed herein.

The method 900 begins and a computing device determines at 902 a job to be processed on data of a database, wherein the job is determined in response to a trigger event and the job is configured to improve data organization of the database or improve query performance for the database. In an embodiment, the job is determined internally to the database and does not include a query received from a user or client account. The job may include, for example, clustering or reclustering a database table, refreshing a materialized view that has become stale with respect to its source table, compacting one or more database rows or tables, executed a storage procedure, upgrading a file or micro-partition of database table, and so forth.

The method 900 continues and the computing device identifies at 904 one or more micro-partitions within the database that must be processed to execute the job. In an embodiment, the database includes a plurality of tables that each include one or more immutable storage devices referred to as a micro-partition, wherein the micro-partition cannot be updated in-place but must instead be recreated in response to, for example, an insert, delete, or update DML (Data Manipulation Language) command. In such an embodiment, the computing device may identify, for example, that one or more materialized view micro-partitions must be regenerated to sync the materialized view with its source table. Further in such an embodiment, the computing device may identify, for example, one or more micro-partitions that may be spread across one or more database tables that must be reclustered to complete a clustering job.

The method 900 continues and the computing device divides at 906 processing of the one or more micro-partitions into multiple discrete tasks. Examples of such multiple discrete tasks include inserting a row into a table, deleting a row from a table, updating a row in a table, updating metadata about a table, updating a change tracking stream about a table, performing a clustering operation, comparing a materialized view with its source table, upgrading a micro-partition, and so forth.

The method 900 continues and the computing device communicates at 908 with a resource manager that is configured to schedule user queries on the database. The computing device communicates at 908 with the resource manager specifically to determine a current or future workload for one or more execution nodes of a plurality of execution nodes in an execution platform. In such an embodiment, the computing device may be a compute service manager and the resource manager may be independent of and remote from the compute service manager. Thus, the resource manager may be configured to schedule and manage the execution of user queries and the compute service manager may be configured to schedule and manage the execution of internal jobs that improve performance or organization of the database. The method 900 continues and the computing device assigns at 910 different tasks of the multiple discrete tasks to different nodes within a plurality of nodes of the execution platform. The computing device assigns at 910 based at least in part on the current or future workload for the one or more execution nodes of the plurality of execution nodes in the execution platform, as received from the resource manager. In an embodiment, user queries that are scheduled by the resource manager may take priority over internal jobs. The method 900 continues the execution platform executes at 912 the multiple discrete tasks, wherein each node of the plurality of nodes of the execution platform is independent of and remote from a plurality of shared storage devices collectively storing the data for the database. In an embodiment, each node of the execution platform and each shared storage device is independent and remote such that the execution platform may be scaled up or down independent of data storage.

In some situations, users (or system administrators) may desire increased performance (e.g., increased query response time). In these situations, additional virtual warehouses may be added to support this increased performance. In other implementations, the compute service manager predicts upcoming resource needs based on scheduled (but not yet executed) jobs or queries. In an embodiment, the compute service manager receives a log of scheduled queries from a resource manager, wherein the resource manager is configured to schedule and manage the execution of user queries received from one or more client accounts. In such an embodiment, client queries may take priority over internal jobs, and the compute service manager may schedule internal jobs to provide sufficient processing capacity for client queries that are scheduled by the resource manager. If the scheduled queries will significantly degrade the system's performance, the compute service manager and/or the resource manager can add more resources prior to executing those queries or jobs, thereby maintaining overall system performance. After those queries or jobs are executed, the added resources can be deactivated by the compute service manager and/or the resource manager.

In some embodiments, the compute service manager predicts a time required to execute a particular job (or group of jobs). Based on current job/query processing performance (e.g., processing delays, system utilization, etc.), the compute service manager determines whether additional resources are needed for that particular job or group of jobs. For example, if the current processing delay exceeds a threshold value, the compute service manager may create one or more new execution nodes to provide additional resources for processing the particular job or group of jobs. After processing of the job or group of jobs is complete, the compute service manager may deactivate the new execution node(s) if they are no longer needed for processing other jobs.

In some embodiments, a particular user may require certain performance levels when processing the user's queries. For example, the user may require a query response within a particular time period, such as 5 seconds. In these embodiments, the compute service manager may allocate additional resources prior to executing an internal job to ensure the user's performance levels are achieved.

As described herein, data processing platform 200 supports the dynamic activation and deactivation of various resources, such as data storage capacity, processing resources, cache resources, and the like. The single data processing platform 200 can be dynamically changed on-demand based on the current data storage and processing requirements of the pending and anticipated data processing requests. As the data storage and processing requirements change, data processing platform 200 automatically adjusts to maintain a substantially uniform level of data processing performance.

Additionally, the described data processing platform 200 permits changes to the data storage capacity and the processing resources independently. For example, the data storage capacity can be modified without making any changes to the existing processing resources. Similarly, the processing resources can be modified without making any changes to the existing data storage capacity.

In some implementations, the same micro-partition is cached by multiple execution nodes at the same time. This multiple caching of micro-partitions helps with load balancing (e.g., balancing data processing tasks) across multiple execution nodes. Additionally, caching a micro-partition in multiple execution nodes helps avoid potential bottlenecks when significant amounts of data are trying to pass through the same communication link. This implementation also supports the parallel processing of the same data by different execution nodes.

The systems and methods described herein take advantage of the benefits of both shared-disk systems and the shared-nothing architecture. The described platform for storing and retrieving data is scalable like the shared-nothing architecture once data is cached locally. It also has all the benefits of a shared-disk architecture where processing nodes can be added and removed without any constraints (e.g., for 0 to N) and without requiring any explicit reshuffling of data.

Figure 10:
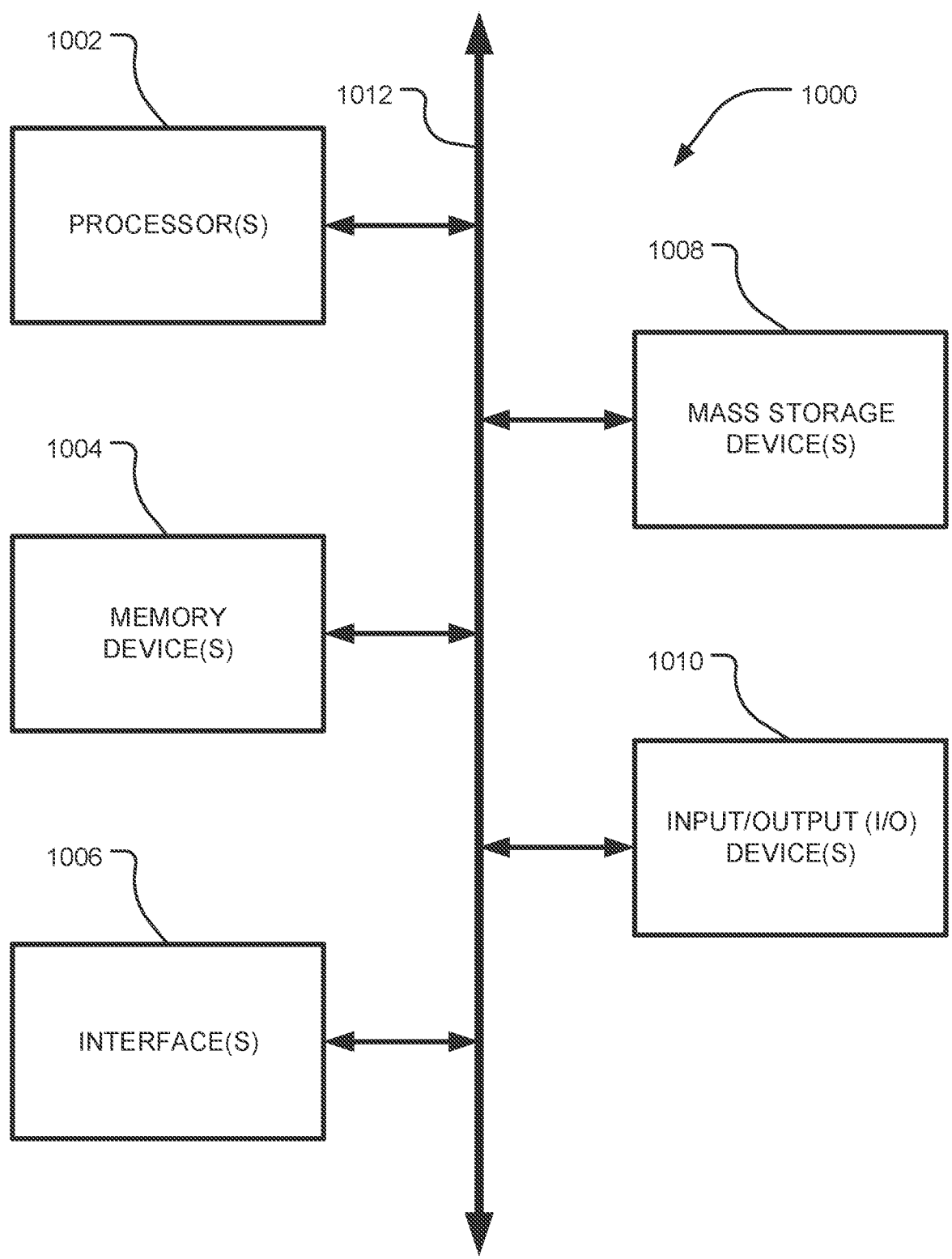
FIG. 10 is a block diagram illustrating an example computing device, according to one embodiment of the disclosure.

FIG. 10 is a block diagram depicting an example computing device 1000. In some embodiments, computing device 1000 is used to implement one or more of the systems and components discussed herein. For example, computing device 1000 may allow a user or administrator to access compute service manager 102. Further, computing device 1000 may interact with any of the systems and components described herein. Accordingly, computing device 1000 may be used to perform various procedures and tasks, such as those discussed herein. Computing device 1000 can function as a server, a client or any other computing entity. Computing device 1000 can be any of a wide variety of computing devices, such as a desktop computer, a notebook computer, a server computer, a handheld computer, a tablet, and the like.

Computing device 1000 includes one or more processor(s) 1002, one or more memory device(s) 1004, one or more interface(s) 1006, one or more mass storage device(s) 1008, and one or more Input/Output (I/O) device(s) 1010, all of which are coupled to a bus 1012. Processor(s) 1002 include one or more processors or controllers that execute instructions stored in memory device(s) 1004 and/or mass storage device(s) 1008. Processor(s) 1002 may also include various types of computer-readable media, such as cache memory.

Memory device(s) 1004 include various computer-readable media, such as volatile memory (e.g., random access memory (RAM)) and/or nonvolatile memory (e.g., read-only memory (ROM)). Memory device(s) 1004 may also include rewritable ROM, such as Flash memory.

Mass storage device(s) 1008 include various computer readable media, such as magnetic tapes, magnetic disks, optical disks, solid state memory (e.g., Flash memory), and so forth. Various drives may also be included in mass storage device(s) 1008 to enable reading from and/or writing to the various computer readable media. Mass storage device(s) 1008 include removable media and/or non-removable media.

I/O device(s) 1010 include various devices that allow data and/or other information to be input to or retrieved from computing device 1000. Example I/O device(s) 1010 include cursor control devices, keyboards, keypads, microphones, monitors or other display devices, speakers, printers, network interface cards, modems, lenses, CCDs or other image capture devices, and the like.

Interface(s) 1006 include various interfaces that allow computing device 1000 to interact with other systems, devices, or computing environments. Example interface(s) 1006 include any number of different network interfaces, such as interfaces to local area networks (LANs), wide area networks (WANs), wireless networks, and the Internet.

Bus 1012 allows processor(s) 1002, memory device(s) 1004, interface(s) 1006, mass storage device(s) 1008, and I/O device(s) 1010 to communicate with one another, as well as other devices or components coupled to bus 1012. Bus 1012 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 1000 and are executed by processor(s) 1002. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

EXAMPLES

The following examples pertain to further embodiments:

Example 1 is a system for scheduling and managing a job to be performed on database data. The system includes a plurality of shared storage devices collectively storing database data. The system includes a compute service manager comprising a software program stored in memory and executed by one or more processors, the compute service manager configured to: determine a job to be processed on the database data, wherein the job is determined in response to a trigger event; determine a plurality of discrete tasks that must be processed to complete the job; divide processing of the plurality of discrete tasks; and assign different tasks of the plurality of discrete tasks to different nodes within a plurality of nodes of an execution platform. The system is such that the execution platform configured to execute the plurality of discrete tasks, wherein each node of the plurality of nodes is independent of and remote from the plurality of shared storage devices.

Example 2 is a system as in Example 1, wherein the execution platform comprises: at least one processor executing one or more tasks of the plurality of discrete tasks assigned thereto by the compute service manager; and at least one local cache caching at least a portion of the database data.

Example 3 is a system as in any of Examples 1-2, wherein the database data is stored in a plurality of tables, wherein each of the plurality of tables comprises one or more immutable storage devices such that an update to at least one of the one or more immutable storage devices comprises recreating the at least one immutable storage device.

Example 4 is a system as in any of Examples 1-3, further comprising a resource manager configured to schedule and manage execution of queries received from a client account by assigning tasks for completing the queries to one or more nodes of the plurality of nodes of the execution platform, wherein the compute service manager is independent of the resource manager, and wherein the job determined by the compute service manager comprises an internal job for improving database performance or organization of the database data and does not include a query received from a client account.

Example 5 is a system as in any of Examples 1-4, wherein the job comprises one or more of: reclustering database data; refreshing a materialized view; or compacting database data.

Example 6 is a system as in any of Examples 1-5, wherein the execution platform asynchronously executes the plurality of discrete tasks, and wherein two or more of the plurality of discrete tasks are executed in parallel by two or more of the plurality of nodes of the execution platform.

Example 7 is a system as in any of Examples 1-6, wherein the trigger event comprises one or more of: ingesting new data into a database table; deleting one or more rows of a database table; updating one or more rows of a database table; a clustering service determining that one or more database tables need to be reclustered; or a refresh materialized view service determining that a materialized view is not synced with its source table.

Example 8 is a system as in any of Examples 1-7, further comprising a queue configured to store one or more jobs to be performed on the database data, wherein the compute service manager is configured to determine the job to be processed by querying the queue to determine whether any unprocessed jobs are available at the queue.

Example 9 is a system as in any of Examples 1-8, wherein the compute service manager is configured to assign different tasks of the plurality of discrete tasks based on one or more of: a schedule defined by a client account; a current workload for the execution platform, wherein the workload comprises one or more of: jobs assigned by the compute service manager or queries received from a client account; or a rule defined by a client account.

Example 10 is a system as in any of Examples 1-9, wherein the compute service manager is further configured to: determine whether to assign a successor to a task; and in response to determining to assign the successor to the task, generating parameters for the successor and placing the successor in a queue.

Example 11 is a method for scheduling and managing jobs to be executed on a database. The method includes determining a job to be processed on database data, wherein the job is determined in response to a trigger event. The method includes determining a plurality of discrete tasks that must be processed to complete the job. The method includes dividing processing of the plurality of discrete tasks and assigning different tasks of the plurality of discrete tasks to different nodes within a plurality of nodes of an execution platform. The method is such that the execution platform is configured to execute the plurality of discrete tasks, wherein each node of the plurality of nodes is independent of and remote from a plurality of shared storage devices collectively storing the database data.

Example 12 is a method as in Example 11, wherein the execution platform comprises: at least one processor executing one or more tasks of the plurality of discrete tasks assigned thereto by the compute service manager; and at least one local cache caching at least a portion of the database data.

Example 13 is a method as in any of Examples 11-12, wherein the database data is stored in a plurality of tables, wherein each of the plurality of tables comprises one or more immutable storage devices such that an update to at least one of the one or more immutable storage devices comprises recreating the at least one immutable storage device.

Example 14 is a method as in any of Examples 11-14, further comprising communicating with a resource manager configured to schedule and manage execution of queries received from a client account and wherein the resource manager further assigns tasks to the plurality of nodes of the execution platform, and wherein the job comprises an internal job for improving database performance or organization of the database data and does not include a query received from a client account.

Example 15 is a method as in any of Examples 11-14, wherein the job comprises one or more of: reclustering database data; refreshing a materialized view; or compacting database data.

Example 16 is a method as in any of Examples 11-15, wherein the trigger event comprises one or more of: ingesting new data into a database table; deleting one or more rows of a database table; updating one or more rows of a database table; a clustering service determining that one or more database tables need to be reclustered; or a refresh materialized view service determining that a materialized view is not synced with its source table.

Example 17 is a method as in any of Examples 11-16, wherein determining the job to be processed comprises querying a queue to determine whether any unprocessed jobs are available at the queue, wherein each of the unprocessed jobs are generated based on a trigger event.

Example 18 is a method as in any of Examples 11-17, wherein assigning different tasks of the plurality of discrete tasks comprises assigning based on one or more of: a schedule defined by a client account; a current workload for the execution platform, wherein the workload comprises one or more of: jobs assigned by the compute service manager or queries received from a client account; or a rule defined by a client account.

Example 19 is a method as in any of Examples 11-18, further comprising: determining whether to assign a successor to a task; and in response to determining to assign the successor to the task, generate parameters for the successor and place the successor in a queue.

Example 20 is a system for scheduling and managing jobs to be executed on a database. The system includes means for storing database data and means for determining a job to be processed on the database data, wherein the job is determined in response to a trigger event. The system includes means for determining a plurality of discrete tasks that must be processed to complete the job. The system includes means for dividing processing of the plurality of discrete tasks and means for assigning different tasks of the plurality of discrete tasks to different nodes within a plurality of nodes of an execution platform. The system is such that the execution platform executing the plurality of discrete tasks, wherein each node of the plurality of nodes is independent of and remote from the means for storing database data.

Example 21 is a system as in Example 20, further comprising means for scheduling and managing execution of queries received from a client account by assigning tasks for completing queries to one or more nodes of the execution platform, wherein the means for scheduling and managing execution of queries is independent of the means for determining the job, and wherein the job comprises an internal job for improving database performance or organization of the database data and does not include a query received from a client account.

Example 22 is a system as in any of Examples 20-21, wherein the job comprises one or more of: reclustering database data; refreshing a materialized view; or compacting database data.

Example 23 is a system as in any of Examples 20-22, wherein the trigger event comprises one or more of: ingesting new data into a database table; deleting one or more rows of a database table; updating one or more rows of a database table; a clustering service determining that one or more database tables need to be reclustered; or a refresh materialized view service determining that a materialized view is not synced with its source table.

Example 24 is a system as in any of Examples 20-23, wherein the means for assigning different tasks of the plurality of discrete tasks is configured to assign different tasks based on one or more of: a schedule defined by a client account; a current workload for the execution platform, wherein the workload comprises one or more of: jobs assigned by the compute service manager or queries received from a client account; or a rule defined by a client account.

Example 25 is a system for managing and executing database tasks. The system includes means for determining a task to be executed in response to a trigger event. The system includes means for determining a query plan for executing the task, wherein the query plan comprises a plurality of discrete subtasks. The system includes means for assigning the plurality of discrete subtasks to one or more nodes of a plurality of nodes of an execution platform. The system includes means for determining whether execution of the task is complete. The system includes means for storing a record of a completed task in response to determining the execution of the task is complete.

Example 26 is a system as in Example 25, further comprising: means for generating a successor task in response to determining the execution of the task is complete; and means for persisting the successor task to a task queue.

Example 27 is a system as in any of Examples 25-26, further comprising means for retrieving the task from a task queue, wherein the task queue is stored across one or more of a plurality of shared storage devices that are separate from the execution platform.

Example 28 is a system as in any of Examples 25-27, further comprising means for scaling a number of available execution nodes in the execution platform up or down based on a number of tasks waiting in the task queue.

Example 29 is a system as in any of Examples 25-28, further comprising means for deserializing the task to resolve a context for the task, wherein the context comprises one or more of an account identification, a role, or a user for executing the task.

Example 30 is a system as in any of Examples 25-29, wherein the means for determining the query plan for executing the task is configured to generate a Structured Query Language (SQL) job, and wherein the plurality of discrete subtasks must be processed to complete the SQL job.

Example 31 is a system as in any of Examples 25-30, further comprising means for dividing the processing of the plurality of discrete subtasks based on metadata, wherein the metadata pertains to database data that is stored across a plurality of shared storage devices, and wherein the metadata is stored separately from the database data.

Example 32 is a system as in any of Examples 25-31, wherein the means for storing the record of the completed task is configured to store the record in persistent storage and is further configured to purge the record from the persistent storage after a threshold duration of time.

Example 33 is a system as in any of Examples 25-32, further comprising means for executing each of the plurality of discrete subtasks such that two or more of the plurality of discrete subtasks are executed in parallel by two or more execution nodes of the execution platform.

Example 34 is a system as in any of Examples 25-33, wherein the trigger event comprises one or more of: ingesting new data into a database table; deleting one or more rows of a database table; updating one or more rows of a database table; a clustering service determining that one or more database tables need to be reclustered; or a refresh materialized view service determining that a materialized view is not synced with its source table.

Example 35 is a method for managing and executing database tasks. The method includes determining a task to be executed in response to a trigger event. The method includes determining a query plan for executing the task, wherein the query plan comprises a plurality of discrete subtasks. The method includes assigning the plurality of discrete subtasks to one or more nodes of a plurality of nodes of an execution platform. The method includes determining whether execution of the task is complete. The method includes storing a record of a completed task in response to determining the execution of the task is complete.

Example 36 is a method as in Example 35, further comprising: generating a successor task in response to determining the execution of the task is complete; and persisting the successor task to a task queue.

Example 37 is a method as in any of Examples 35-36, further comprising retrieving the task from a task queue, wherein the task queue is stored across one or more of a plurality of shared storage devices that are separate from the execution platform.

Example 38 is a method as in any of Examples 35-37, further comprising scaling a number of available execution nodes in the execution platform up or down based on a number of tasks waiting in the task queue.

Example 39 is a method as in any of Examples 35-38, further comprising deserializing the task to resolve a context for the task, wherein the context comprises one or more of an account identification, a role, or a user for executing the task.

Example 40 is a method as in any of Examples 35-39, wherein determining the query plan for executing the task comprises generating a Structured Query Language (SQL) job, wherein the plurality of discrete subtasks must be processed to complete the SQL job.

Example 41 is a method as in any of Examples 35-40, further comprising dividing the processing of the plurality of discrete subtasks based on metadata, wherein the metadata pertains to database data that is stored across a plurality of shared storage devices, and wherein the metadata is stored separately from the database data.

Example 42 is a method as in any of Examples 35-41, wherein storing the record of the completed task comprises storing the record in persistent storage and further comprises purging the record from the persistent storage after a threshold duration of time.

Example 43 is a method as in any of Examples 35-42, wherein the trigger event comprises one or more of: ingesting new data into a database table; deleting one or more rows of a database table; updating one or more rows of a database table; a clustering service determining that one or more database tables need to be reclustered; or a refresh materialized view service determining that a materialized view is not synced with its source table.

Example 44 is a system. The system includes a plurality of shared storage devices collectively storing database data. The system includes a compute service manager comprising a software program stored in memory and executed by one or more processors, the compute service manager configured to: determine a task to be executed in response to a trigger event; determine a query plan for executing the task, the query plan comprising a plurality of discrete subtasks; assign the plurality of discrete subtasks to one or more nodes of a plurality of nodes of an execution platform; determine whether execution of the task is complete; and in response to determining the execution of the task is complete, storing a record indicating the task was completed; the execution platform configured to execute the plurality of discrete subtasks, wherein each node of the plurality of nodes of the execution platform is independent of and remote from the plurality of shared storage devices.

Example 45 is a system as in Example 44, wherein the compute service manager is further configured to: retrieve the task from a task queue, wherein the task queue is stored across the plurality of shared storage devices; generate a successor task in response to determining the execution of the task is complete; and persist the successor task to the task queue.

Example 46 is a system as in any of Examples 44-45, wherein the compute service manager is further configured to scale a number of available execution nodes in the execution platform up or down based on a number of tasks within in the task queue.

Example 47 is a system as in any of Examples 44-46, wherein the compute service manager is further configured to: deserialize the task to resolve a context for the task, wherein the context comprises one or more of an account identification, a role, or a user for executing the task; and divide the processing of the plurality of discrete subtasks based on metadata, wherein the metadata pertains to the database data and is stored separately from the database data.

Example 48 is a system as in any of Examples 44-47, wherein the compute service manager is configured to store the record of the completed task in persistent storage and is further configured to purge the record from the persistent storage after a threshold duration of time.

Many of the functional units described in this specification may be implemented as one or more components, which is a term used to more particularly emphasize their implementation independence. For example, a component may be implemented as a hardware circuit comprising custom very large-scale integration (VLSI) circuits or gate arrays, off-the-shelf semiconductors such as logic chips, transistors, or other discrete components. A component may also be implemented in programmable hardware devices such as field programmable gate arrays, programmable array logic, programmable logic devices, or the like.

Components may also be implemented in software for execution by various types of processors. An identified component of executable code may, for instance, comprise one or more physical or logical blocks of computer instructions, which may, for instance, be organized as an object, a procedure, or a function. Nevertheless, the executables of an identified component need not be physically located together but may comprise disparate instructions stored in different locations that, when joined logically together, comprise the component and achieve the stated purpose for the component.

Indeed, a component of executable code may be a single instruction, or many instructions, and may even be distributed over several different code segments, among different programs, and across several memory devices. Similarly, operational data may be identified and illustrated herein within components and may be embodied in any suitable form and organized within any suitable type of data structure. The operational data may be collected as a single data set or may be distributed over different locations including over different storage devices, and may exist, at least partially, merely as electronic signals on a system or network. The components may be passive or active, including agents operable to perform desired functions.

Reference throughout this specification to "an example" means that a feature, structure, or characteristic described in connection with the example is included in at least one embodiment of the present disclosure. Thus, appearances of the phrase "in an example" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on its presentation in a common group without indications to the contrary. In addition, various embodiments and examples of the present disclosure may be referred to herein along with alternatives for the various components thereof. It is understood that such embodiments, examples, and alternatives are not to be construed as de facto equivalents of one another but are to be considered as separate and autonomous representations of the present disclosure.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive.

Those having skill in the art will appreciate that many changes may be made to the details of the above-described embodiments without departing from the underlying principles of the disclosure. The scope of the present disclosure should, therefore, be determined only by the following claims.

What is claimed is:

1. A system comprising:
one or more computer processors; and
one or more computer-readable mediums storing instructions that, when executed by the one or more computer processors, cause the system to perform operations comprising:
determining that a materialized view of a database table is stale in response to determining that a new version of source data associated with the database table has been generated;
in response to determining that the materialized view of the database table is stale, determining a database task to be executed in a database for providing a refreshed materialized view of the database table, the database task comprising a plurality of discrete subtasks;
storing the database task at an execution platform that is distinct from the system;
assigning the plurality of discrete subtasks to one or more nodes of a plurality of nodes of the execution platform;
dividing processing of the plurality of discrete subtasks based on metadata of database data;
determining whether execution of the database task is complete based at least in part on whether the plurality of discrete subtasks have been completed by the one or more nodes; and
in response to determining that execution of the database task is complete, storing a record indicating that the database task is completed.

2. The system of claim 1, the operations further comprising:
generating a successor database task in response to determining that execution of the database task is complete.

3. The system of claim 2, the operations further comprising:
persisting the successor database task to a task queue.

4. The system of claim 1, the operations further comprising:
retrieving the database task from a task queue, wherein the task queue comprises the plurality of discrete subtasks.

5. The system of claim 4, the operations further comprising:
scaling a number of available execution nodes in the execution platform up or down based on a number of database tasks remaining in the task queue.

6. The system of claim 1, the operations further comprising:
deserializing the database task to resolve a context for the database task, wherein the context comprises one or more of an account identification, a role, or a user for executing the database task.

7. The system of claim 1, further comprising:
determining that the materialized view of the database table is stale in response to determining that the new version of a source table of the materialized view has been generated and that the materialized view has not been refreshed to reflect the new version of the source table.

8. The system of claim 1, storing the record indicating that the database task is completed further comprises storing the record in persistent storage and purging the record from the persistent storage after a threshold duration of time.

9. The system of claim 1, the operations further comprising:
executing each of the plurality of discrete subtasks such that two or more of the plurality of discrete subtasks are executed in parallel by two or more execution nodes of the execution platform.

10. A method comprising:
determining that a materialized view of a database table is stale in response to determining that a new version of source data associated with the database table has been generated;
in response to determining that the materialized view of the database table is stale, determining a database task to be executed in a database for providing a refreshed materialized view of the database table, the database task comprising a plurality of discrete subtasks;
storing the database task at an execution platform that is distinct from a computing system;
assigning the plurality of discrete subtasks to one or more nodes of a plurality of nodes of the execution platform;
dividing processing of the plurality of discrete subtasks based on metadata of database data;
determining whether execution of the database task is complete based at least in part on whether the plurality of discrete subtasks have been completed by the one or more nodes; and
in response to determining that execution of the database task is complete, storing a record indicating that the database task is completed.

11. The method of claim 10, further comprising:
generating a successor database task in response to determining that execution of the database task is complete.

12. The of claim 10, further comprising:
determining when the materialized view was last refreshed;
determining that the new version of a source table used to generate the materialized view has been generated; and
determining the database task for providing the refreshed materialized view of the database table in response to determining when the materialized view was last refreshed and determining that the new version of the source table has been generated.

13. The method of claim 10, further comprising:
retrieving the database task from a task queue, wherein the task queue comprises the plurality of discrete subtasks.

14. The method of claim 13, further comprising:
scaling a number of available execution nodes in the execution platform up or down based on a number of database tasks remaining in the task queue.

15. The method of claim 14, further comprising:
deserializing the database task to resolve a context for the database task, wherein the context comprises one or more of an account identification, a role, or a user for executing the database task.

16. The method of claim 10, wherein determining the database task comprises generating a Structured Query Language (SQL) job, and wherein the plurality of discrete subtasks are processed to complete the SQL job.

17. The method of claim 10, storing the record indicating that the database task is completed further comprises storing the record in persistent storage and purging the record from the persistent storage after a threshold duration of time.

18. The method of claim 10, further comprising:
executing each of the plurality of discrete subtasks such that two or more of the plurality of discrete subtasks are executed in parallel by two or more execution nodes of the execution platform.

19. A non-transitory computer-readable medium storing instructions that, when executed by one or more computer processors of one or more computing devices, cause the one or more computing devices to perform operations comprising:
- determining that a materialized view of a database table is stale in response to determining that a new version of source data associated with the database table has been generated;
- in response to determining that the materialized view of the database table is stale, determining a database task to be executed in a database for providing a refreshed materialized view of the database table, the database task comprising a plurality of discrete subtasks;
- storing the database task at an execution platform that is distinct from the one or more computing devices;
- assigning the plurality of discrete subtasks to one or more nodes of a plurality of nodes of the execution platform;
- dividing processing of the plurality of discrete subtasks based on metadata of database data;
- determining whether execution of the database task is complete based at least in part on whether the plurality of discrete subtasks have been completed by the one or more nodes; and
- in response to determining that execution of the database task is complete, storing a record indicating that the database task is completed.

20. The non-transitory computer-readable medium of claim 19, the operations further comprising:
- generating a successor database task in response to determining that execution of the database task is complete.

* * * * *

UNITED STATES PATENT AND TRADEMARK OFFICE
CERTIFICATE OF CORRECTION

PATENT NO. : 11,379,492 B2
APPLICATION NO. : 17/477663
DATED : July 5, 2022
INVENTOR(S) : Rosen et al.

It is certified that error appears in the above-identified patent and that said Letters Patent is hereby corrected as shown below:

On the Title Page

On page 2, in Column 1, item (56) under "U.S. Patent Documents", Line 27, delete "2011/0047554" and insert --2011/0047555-- therefor In the Claims In Column 30, Line 32, in Claim 12, after "The", insert --method--

Signed and Sealed this
Twenty-first Day of March, 2023

Katherine Kelly Vidal
*Director of the United States Patent and Trademark Office*